(12) United States Patent
Sipolins et al.

(10) Patent No.: US 12,504,819 B1
(45) Date of Patent: Dec. 23, 2025

(54) SYSTEMS AND METHODS FOR AN IMPROVED INPUT DEVICE

(71) Applicant: Adeia Guides Inc., San Jose, CA (US)

(72) Inventors: Aldis Sipolins, Somerville, MA (US); Serhad Doken, Bryn Mawr, PA (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/883,496

(22) Filed: Sep. 12, 2024

(51) Int. Cl.
*G06F 3/01* (2006.01)
*A63F 13/212* (2014.01)
*G06F 3/0346* (2013.01)
*G06F 3/038* (2013.01)

(52) U.S. Cl.
CPC ............ *G06F 3/015* (2013.01); *A63F 13/212* (2014.09); *G06F 3/0346* (2013.01); *G06F 3/038* (2013.01)

(58) Field of Classification Search
CPC ........ G06F 3/015; G06F 3/0346; G06F 3/038; A63F 13/212
See application file for complete search history.

(56) References Cited

U.S. PATENT DOCUMENTS

| | | | |
|---|---|---|---|
| 8,447,704 B2 | 5/2013 | Tan et al. | |
| 9,483,123 B2* | 11/2016 | Aleem | G06F 3/014 |
| 10,409,371 B2* | 9/2019 | Kaifosh | G06N 20/00 |
| 10,478,099 B2 | 11/2019 | Lor et al. | |
| 10,712,819 B2* | 7/2020 | Byerley | G06F 3/0346 |
| 11,493,993 B2* | 11/2022 | Rubin | G06F 3/014 |
| 2008/0266257 A1* | 10/2008 | Chiang | G06F 3/0488 345/163 |
| 2010/0069780 A1* | 3/2010 | Schuette | G06F 3/015 600/547 |
| 2011/0225425 A1 | 9/2011 | Kotla et al. | |
| 2016/0313801 A1* | 10/2016 | Wagner | G06F 1/163 |

(Continued)

FOREIGN PATENT DOCUMENTS

GB 2579659 A 7/2020

OTHER PUBLICATIONS

"DaVinci Resolve 19", Blackmagic Design, Online avaible at https://www.blackmagicdesign.com/products/davinciresolve, 19 pages.

(Continued)

*Primary Examiner* — Ariel A Balaoing
(74) *Attorney, Agent, or Firm* — HALEY GUILIANO LLP

(57) ABSTRACT

Systems and methods are provided for receiving input via an input device. A first signal is received via a muscle activity sensor. It is determined that the first signal corresponds to a movement of a user digit that does not correspond to a first interaction with an input element of the input device. A digit movement direction is identified, and a prediction of a second interaction with an input element is generated. A first confidence level associated with the prediction is below a threshold, and a second signal is received via a proximity sensor. A velocity of the user digit is determined, and a prediction of the second interaction with a first input element is made. It is identified that a second confidence level associated with the prediction is above the threshold, and a third signal associated with the first input element of the input device is generated for output.

18 Claims, 13 Drawing Sheets

(56) References Cited

U.S. PATENT DOCUMENTS

| | | | | |
|---|---|---|---|---|
| 2018/0221177 | A1* | 8/2018 | Kaltenbach | G06F 3/0383 |
| 2018/0247443 | A1* | 8/2018 | Briggs | G06T 13/205 |
| 2020/0401224 | A1* | 12/2020 | Cotton | A61B 5/742 |
| 2021/0236925 | A1* | 8/2021 | Hammons | H04N 21/44008 |
| 2022/0057865 | A1* | 2/2022 | Ballagas | G06F 3/015 |
| 2022/0291753 | A1* | 9/2022 | Erivantcev | G06F 3/0482 |
| 2023/0076716 | A1 | 3/2023 | Dogrusoz et al. | |
| 2023/0105223 | A1 | 4/2023 | Dogrusoz et al. | |
| 2023/0281938 | A1* | 9/2023 | Yan | G06F 3/017 345/633 |
| 2024/0118749 | A1* | 4/2024 | Holinski | G06F 3/038 |
| 2025/0117131 | A1* | 4/2025 | Gabrilovich | G06F 3/017 |

OTHER PUBLICATIONS

"Frames Win Games", NVIDIA, Retrieved from https://www.nvidia.com/en-eu/geforce/campaigns/frames-win-games/, 9 pages.

"Giant Step into the Future': NVIDIA CEO Unveils Geforce RTX 30 Series GPUs", NVIDIA by Wuebbling, M., retrieved from https://blogs.nvidia.com/blog/nvidia-ceo-geforce-rtx-30-series-gpus/, Sep. 1, 2020, 12 pages.

"Mouse Sensitivity Calculator and Converter", Same Aim—Different Game, Online Available at https://www.mouse-sensitivity.com, 2 pages.

"Oculus Touch Teardown", iFixit, Online Available at https://www.ifixit.com/Teardown/Oculus+Touch+Teardown/75109, 9 pages.

"Quick time event", Wikipedia, Online available at https://en.wikipedia.org/wiki/Quick_time_event, 6 pages.

"Real-time camera-based 3D hand tracking-Computer graphics and Virtual Reality", Online Available at https://cgvr.cs.uni-bremen.de/research/handtracking/, 5 pages.

"Starfield", Bethesda, Online Available at https://bethesda.net/en/game/starfield, 12 pages.

"Valve's Steam VR knuckle controllers make flipping the bird possible in VR", Digital Trends by Jon Martindale, available online at https://www.digitaltrends.com/gaming/valve-vr-knuckle-controller-sensors/, Jun. 23, 2017, 8 pages.

"Working Principle of Capacitive Proximity Sensor", Robu, Available Online At https://robu.in/capacitive-proximity-sensor-working-principle/, Mar. 27, 2020, 7 pages.

Graziano, D., "Myo review: A futuristic yet unnecessary way to control your PC", CNET, available online at https://www.cnet.com/reviews/myo-gesture-control-armband-review/#google_vignette, Aug. 26, 2015, 11 pages.

Heaney, D., "Oculus Firmware Reveals New Touch Controllers, Referencing Improvements to Tracking, FingerSensing, Haptics", available online at https://www.uploadvr.com/oculus-jedi-controller-driver-found/, Apr. 16, 2020, 11 pages.

Jana, S. et al., "Temporal cascade of frontal, motor and muscle processes underlying human action-stopping", eLife, vol. 9:e50371, 2020, 28 pages.

Jarque-Bou, N. J. et al., "A Systematic Review of EMG Applications for the Characterization of Forearm and Hand Muscle Activity during Activities of Daily Living: Results, Challenges, and Open Issues", Sensors, vol. 21, No. 9:3035, Apr. 26, 2021, 26 pages.

Mclinden, S. et al., "Utilizing Electromyographic Video Games Controllers to Improve Outcomes for Prosthesis Users", Applied Psychophysiology and Biofeedback, vol. 49, 2024, pp. 63-69.

Melcer, E. F. et al., "CTRL-Labs: Hand Activity Estimation and Real-time Control from Neuromuscular Signals", CHI EA '18: Extended Abstracts of the 2018 CHI Conference on Human Factors in Computing Systems, Apr. 20, 2018, Paper No. D303, pp. 1-4.

Muguro, J. et al., "Development of Surface EMG Game Control Interface for Persons with Upper Limb Functional Impairments", Signals, vol. 2, Nov. 12, 2021, pp. 834-851.

Raud, L. et al., "Partial response electromyography as a marker of action stopping", eLife, vol. 11:e70332, May 26, 2022, 34 pages.

Wilson, D., "Combating Input Lag and Final Words-Exploring Input Lag Inside and Out", AnandTech, Online Available at https://www.anandtech.com/show/2803/7, Jul. 16, 2009, 7 pages.

* cited by examiner

SETTINGS

BINDINGS — 802

| ACTION | MAIN KEY — 804 | PLAY TO SET — 806 | PLAY TO TEST — 808 |
|---|---|---|---|
| MAIN GAMEPLAY | | | |
| Forward | W | PLAY TO SET | TEST |
| Back | S | PLAY TO SET | TEST |
| Strafe Left | A | PLAY TO SET | TEST |
| Strafe Right | D | PLAY TO SET | TEST |
| Primary Attack | MOUSE1 | PLAY TO SET | TEST |
| Secondary Attack | MOUSE2 | PLAY TO SET | TEST |
| Melee | V | PLAY TO SET | TEST |
| Throw Grenade | G | PLAY TO SET | TEST |
| Activate | E | PLAY TO SET | TEST |
| Reload/Sheathe Weapon | R | PLAY TO SET | TEST |
| Power | Z | PLAY TO SET | TEST |
| Hand Scanner/Flashlight | F | PLAY TO SET | TEST |
| Open Data Menu* — 819 | | | |

822  824
812 DEFAULTS  B BACK  TAB

*Denotes actions that require a binding. — 818
BINDING CONFLICTS — 820

FIG. 8

SYSTEMS AND METHODS FOR AN IMPROVED INPUT DEVICE

The present disclosure is generally directed to systems and methods for enabling improved input at an input device.

SUMMARY

Computing devices, such as desktop computers, laptops, smartphones, tablets and games consoles, may receive input via one or more peripheral input devices, such as keyboards, mice and gamepads. Typically, an input is provided via an interaction with one or more buttons or sticks on the input device, and the input device generates a signal indicative of the interaction that is transmitted to the computing device. There is an inherent delay associated with this method of providing input to a computing device including, for example, a delay associated with the button interaction itself, a delay associated with transmitting the signal to the computing device, a delay associated with processing the signal and a delay associated with generating an output at the computing device receiving the signal. Physical input devices of these types also have a delay associated with the user themself, not least because there is a physical delay between a user forming a thought associated with interacting with an input device (e.g., thinking "Press button A") and a user digit, such as a finger, actuating the relevant button on an input device. Typical computing input devices introduce delays that, in some scenarios, are noticeable and have an impact on the action being performed via the input device. This is particularly relevant to automotive industries, where a delay in a received input may have a measurable impact on how well a vehicle can be controlled and, in particular, how quickly a driver may be able to respond to an emergency situation. In a motorsport scenario, high performance athletes may have reaction times that are comparable to the delay introduced in some systems. In a further example, assisted robotic surgery (e.g., surgery performed by a surgeon directing an operating robot using manual controls) may require input to be provided with minimal delay. In e-sports, for example, reaction times can be as quick as 150 ms, which may be comparable to the delay introduced by a combination of an input device and a computing device. In an example, a mouse attached to a computing device may have a lag of 8 ms, a central processing unit of the computing device may introduce a delay of 20 ms, a graphical processing unit (GPU) of the computing device may introduce a delay of 30 ms, a frame transmission from the GPU to a display attached to the computing device may introduce a delay of 16 ms, along with a double buffer vsync of 16 ms, and a response time of the display may be 12 ms, which gives a total delay of 102 ms.

To help address these problems, systems and methods are provided herein that enable an improved input device. In particular, the input device is improved by reducing the delay inherent to using different types of input devices by detecting muscle signals associated with actuating one or more input elements of an input device, so that a signal associated with that input element may be generated before a user physically interacts with the input element.

In accordance with some aspects of the disclosure, a first method is provided. In an embodiment, the method includes receiving, via a muscle activity sensor associated with an input device comprising one or more input elements, a first signal, and comparing the first signal to one or more stored signals. It is determined that the first signal corresponds to a movement of a user digit based on the comparing, and it is identified that the first signal does not correspond to a first interaction with one of the one or more input elements of the input device based on the comparing. A movement direction of the user digit is identified based on the first signal, and a first prediction of a second anticipated interaction with one of the one or more input elements of the input device is generated based on the identified movement direction of the user digit. It is identified that a first confidence level associated with the first prediction is below a threshold confidence level, and a second signal is received via a proximity sensor associated with the input device. A velocity of the user digit is determined based on the second signal, and a second prediction of the second anticipated interaction with a first input element of the input device is made based on the first signal and the determined velocity of the user digit. It is identified that a second confidence level associated with the second prediction is above the threshold confidence level, and a third signal indicative of the second anticipated interaction with the first input element of the input device is generated for output and is based on the second prediction.

In an example system, a gamepad is connected to a gaming console, and a user wears an electromyography sensor while using the gamepad. The electromyography sensor generates signals based on the user's muscle activity, and the signals are transmitted to the gaming console. An application running at the gaming console compares the received signals to one or more stored signals and determines that the received signal corresponds to a movement of a user finger. It is identified, based on the comparing, that the first signal does not correspond to an interaction with a button on the game pad; however, a direction of movement of the finger is identified. This identified direction of movement is used to generate a prediction of an interaction with a particular button on the gamepad; however, in this example, this prediction has a relatively low confidence level associated with it. In order to improve the confidence level of the prediction, a signal is received from a proximity sensor that is associated with a button on the game pad. This signal received from the proximity sensor is utilized by the application running on the games console to determine a velocity of the user digit. Another prediction of an interaction with a particular button on the gamepad is generated based on the signal from the muscle activity sensor and the signal from the proximity sensor, and, based on this prediction, a signal associated with the predicted button is generated for output at the gamepad and is transmitted to the gaming console before that button is physically interacted with by the user.

In accordance with some aspects of the disclosure, a second method is provided. In an embodiment, the method includes generating, for output, a first sequence of inputs to be received at an input device, and receiving, at the input device, the first sequence of inputs. A first plurality of signals associated with the first sequence of inputs are received via a muscle activity sensor associated with the input device. A second sequence of inputs to be received at the input device are generated for output, and the second sequence of inputs are received at the input device. A second plurality of signals associated with the second sequence of inputs are received via the muscle activity sensor, and the first plurality of signals are compared with the second plurality of signals. It is determined that the first plurality of signals is associated with a fastest reaction time based on the comparing, and a recommendation to use the first sequence of inputs that is associated with the fastest reaction time is generated for output.

In an example system, a first sequence of buttons to be pressed on a gamepad is displayed at a display connected to a games console, for example, up, down, left, right, A, B, C, D. The games console receives button press signals from the gamepad associated with this first sequence of button presses. In some examples, the games console may utilize the received button signals to verify that the correct sequence of buttons has been pressed. The games consol also receives via a muscle activity sensor, such as an electromyography sensor, muscle activity signals associated with the received first sequence of inputs. Subsequently, the games console generates a second sequence of buttons to be pressed on a gamepad, and these are also displayed at the display connected to the games console, for example, A, B, C, D, right shoulder button, left shoulder button, up, down. The games console receives button press signals from the gamepad associated with this second sequence of button presses. Again, in some examples, the games console may utilize the received button signals to verify that the correct sequence of buttons has been pressed. The games console also receives via a muscle activity sensor, such as an electromyography sensor, muscle activity signals associated with the received second sequence of inputs. The games console compares the two sets of muscle activity signals received from the electromyography sensor in order to determine which sequence of button presses has the fastest reaction time associated with it. For example, the first set of button presses may have an average reaction time (for example, the time at which the initiation of muscle activity associated with a button press is detected) of 5 ms associated with button press, whereas the second sequence of button presses may have an average reaction time of 6 ms for each button press. In this example, the first sequence of button presses has a faster average reaction time, and a recommendation for the first sequence of button presses is displayed at the display connected to the games console.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 8 shows an example graphical user interface (GUI), in accordance with some embodiments of the disclosure;

Figure 11:
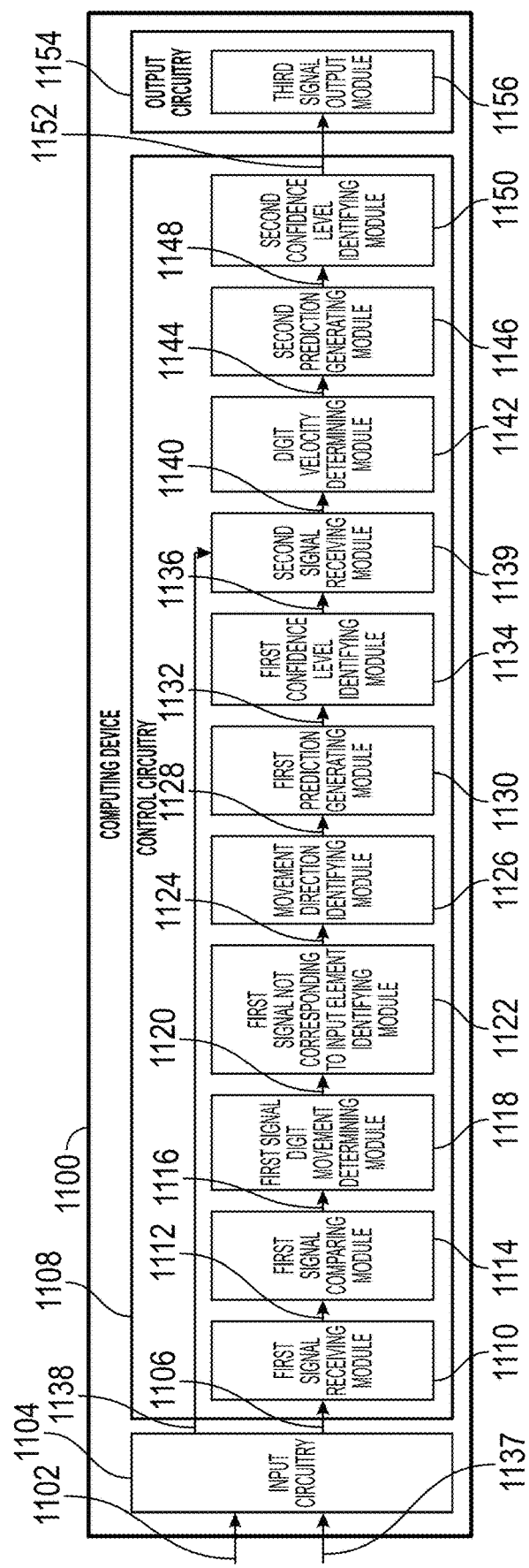
Figure 12:
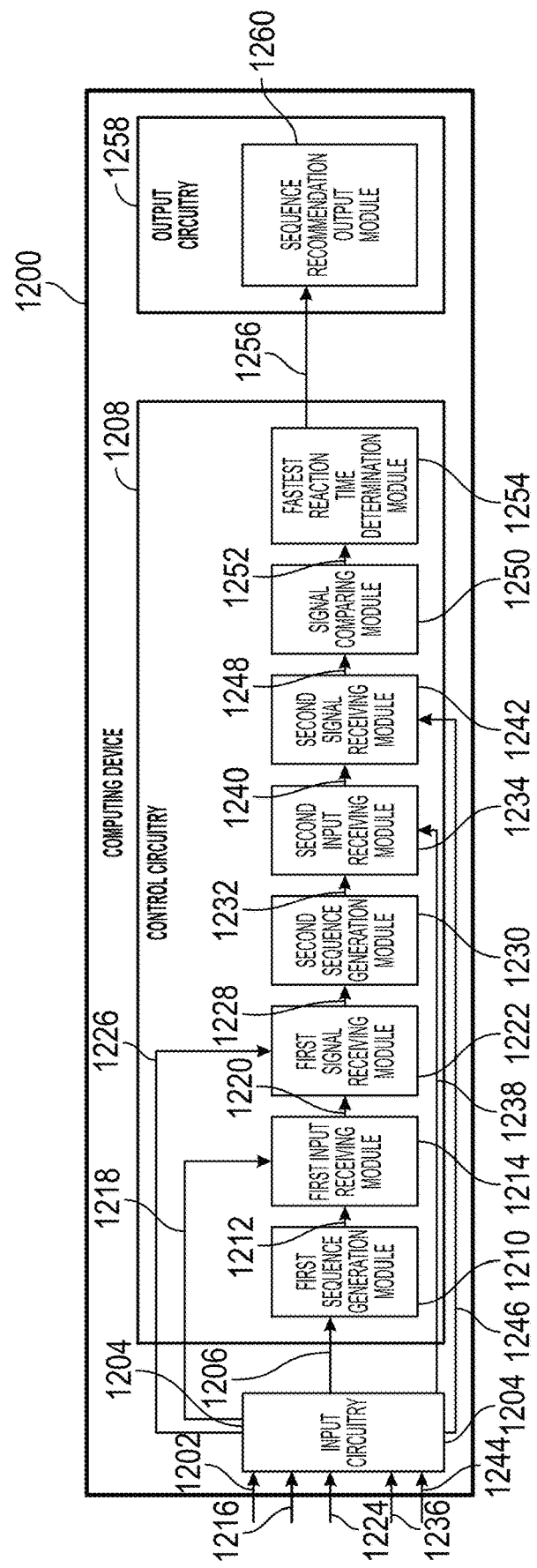

FIG. 11 shows a block diagram representing components of a computing device and dataflow therebetween for enabling an improved input device, in accordance with some embodiments of the disclosure; and FIG. 12 shows a block diagram representing components of a computing device and dataflow therebetween for enabling improved input at an input device, in accordance with some embodiments of the disclosure.

DETAILED DESCRIPTION

The disclosed methods and systems may be implemented on one or more devices, such as input devices, user devices and/or computing devices. The input device may be any device for providing input to a user device and/or computing device. As referred to herein, the input device may be, for example, a gamepad, an extended reality headset controller, an input device comprising eye tracking, a smart glass paired ring, one or more joysticks, a steering wheel controller, a touchscreen, an infrared input device, a Bluetooth input device, a Wi-Fi input device, a computing device with an integrated controller (such as a Steam Deck or a Nintendo Switch), a keyboard, a mouse and/or a microphone. In some examples, the input device may be a device that can receive an input moving the input device through six degrees of freedom and generate an output signal based on that received input. As referred to herein, the user device and/or computing device can be any device comprising a processor and memory, for example, a handheld computer, a mobile telephone, a portable video player, a portable music player, a portable gaming machine, a smartphone, a smartwatch, a smart speaker, an augmented reality headset, a mixed reality device, a virtual reality device, a gaming console, a vehicle infotainment headend, a vehicle steering wheel, an input device associated with a vehicle, or any other computing equipment, wireless device, and/or combination of the same.

A muscle activity sensor may be any sensor that can measure muscle activity and transmit a signal indicative of the measured muscle activity. In some examples, the muscle activity sensor may be integrated with the input device, and in other examples, the muscle activity sensor may be external to the input device. In some examples, the muscle activity sensor may transmit a signal to the input device, and in other examples, the muscle activity sensor may transmit a signal to a computing device that the input device is connected to. The muscle activity sensor may transmit signals via a cable and/or via wireless means, such as Bluetooth and/or Wi-Fi. The muscle activity sensor may be powered by a battery and/or may be powered via a power cable. Muscle activity sensors include electromyography (EMG) sensors and force-sensitive resistors. EMG sensors can measure the electrical impulses produced during muscle contractions, and may be used to detect muscle activity signaling the onset of a motor action before it becomes an interaction with an input element of an input device, such as a button press. This may be referred to as a "start signal."

A typical (i.e., non-athlete) human reaction time is on the order of 250 ms; however, this is delayed compared to available signals of intent in our bodies. This is because intended motor movements begin as a signal in the brain before being sent to the muscles where they are transformed into observable movement. Following a visual cue, it may be possible to reliably detect an intent to interact with an input element, such as pressing a button, via an electroencephalogram signal after 120 ms, a start signal via EMG after 160 ms, and a behavioral response after 220 ms. An EMG signal is generated upstream of a behavioral response and provides a measure of user intent that occurs before the response itself. In some examples, EMG may be used to detect the initiation of an interaction with a user input element up to 70 ms before the actual input occurs.

For an EMG signal, the start signal is a rapid increase in amplitude after a user has initiated an action, and the muscle has begun to contract. The sudden jump in amplitude that necessarily precedes an interaction with an input element is the start signal, which is distinguishable from baseline activity. The EMG start signal may be identified by looking at pure voltage (i.e, as an output from the EMG sensor); however, a deeper analysis of EMG data may reveal which muscle groups are active, and therefore which direction of motion to expect from which digit, or finger. EMG data is typically collected from an array of sensors consistently placed around a forearm of a user. This form factor makes it possible to distinguish between patterns of EMG activity that correspond to various muscle groups. Given that each digit, or finger, has a limited set of movements (e.g., extension and/or abduction) associated with specific muscles, this makes it possible to predict, for example, whether a thumb has initiated, for example, a pressing down or lifting up action. It is not necessary to identify specific muscles, but rather to identify the pattern of EMG sensor data that corresponds to each type of movement.

An input element is any part of an input device that is configured to receive an input. Input elements include buttons, pads, toggles, sticks and touch-sensitive regions. In some examples, an input device may comprise a motion sensor, such as an accelerometer, and a gyroscope and/or an inertial measurement unit (IMU), or the input device may be an input element in itself. In response to receiving input via an input element, the input device typically generates a signal indicative of the input received. This signal may then be transmitted to, for example, a computing device that the input device is connected to.

A proximity sensor may be any sensor that can detect a nearby object, such as a digit, or finger, without physical contact. Proximity sensors include capacitance proximity sensors that detect changes in the capacitance between a target (such as a finger or digit) and a sensor. The amount of capacitance typically varies depending on the size and distance of the target object, and enables the detection of the position of a user's digits, or fingers, relative to the buttons on a controller. Other proximity sensors include inductive proximity sensors, ultrasonic proximity sensors, optical proximity sensors and magnetic proximity sensors. In some examples, one or more of the proximity sensors may be used in conjunction with a glove that enables a sensor to work, such as a glove comprising one or more metallic elements to enable an induction sensor to detect a finger, or digit. A proximity sensor generates and outputs a signal in response to an object, such as a digit, coming close to the sensor.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media card, register memory, processor cache, random access memory (RAM) and/or a solid-state drive.

Figure 1:
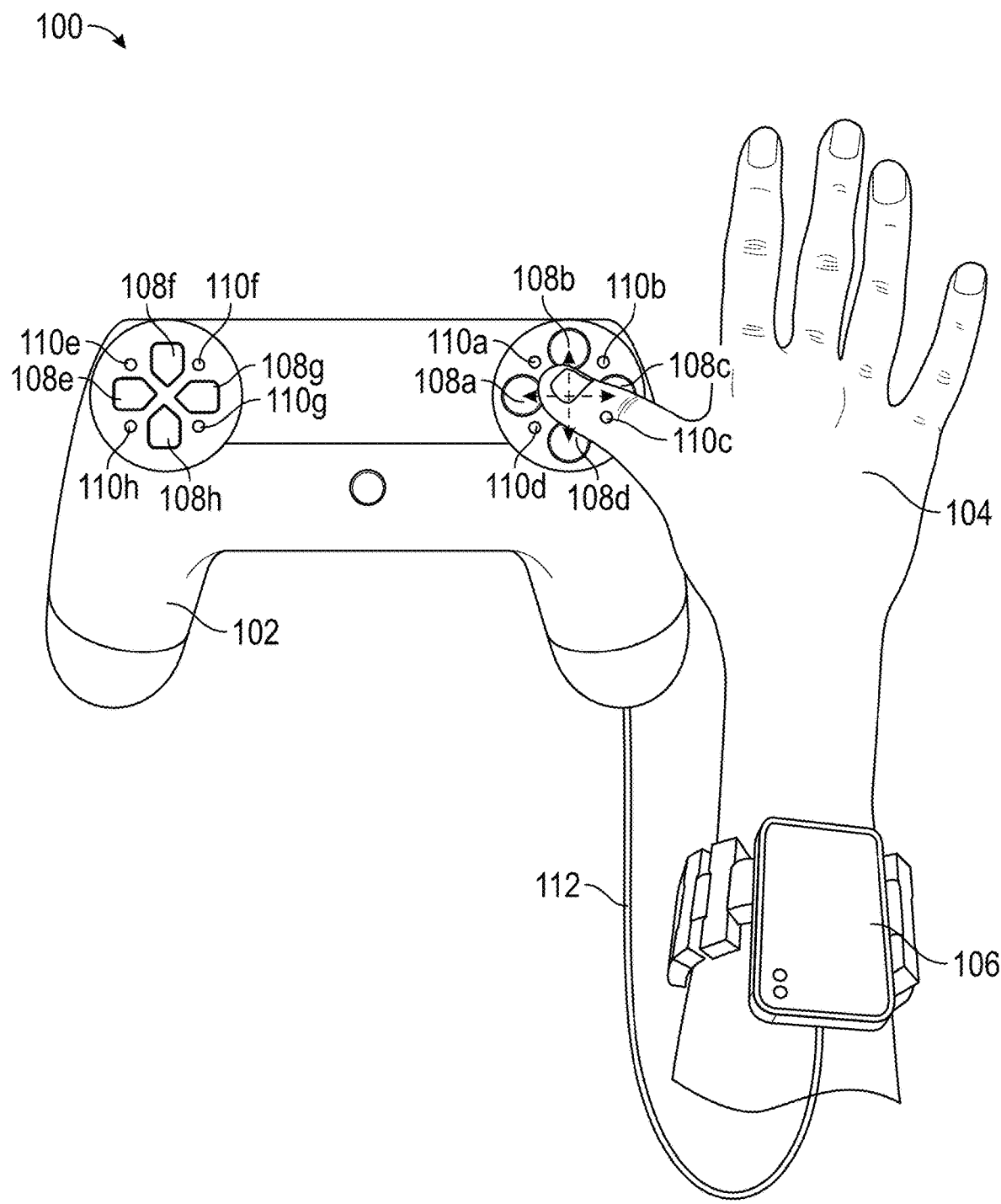
FIG. 1 shows an example environment for enabling an improved input device, in accordance with some embodiments of the disclosure.

FIG. 1 shows an example environment for enabling an improved input device, in accordance with some embodiments of the disclosure. The environment 100 comprises an input device, such as a gamepad 102. Input is typically provided via a user hand 104 comprising a plurality of fingers, or digits. A muscle activity sensor, such as an EMG sensor 106, measures electrical impulses produced during muscle contractions and generates one or more signals indicating the measured electrical impulses, enabling muscle activity that precedes motor actions to be detected. The generated signals may be processed by a processing unit integral to the gamepad, or the generated signals may be transmitted to the computing device that the gamepad is controlling, and processed at that computing device in order to help determine an intended button press before a button is actually pressed. In some examples, the latency associated with transmitting the generated signals to the computing device may be in the order of 10 ms. In other examples, the latency may be increased by an input device, such as a wireless controller running a communication stack, such as a Bluetooth communication stack. In another example, this may be another computing device, such as a cloud server. In this example, the muscle activity sensor is external to the input device; however, in some examples (not shown), the muscle activity sensor may be integrated in the input device. The gamepad 102 comprises a plurality of input elements, in this example, buttons 108a-h. The buttons are arranged in two groups, a first group comprising A, B, C, D buttons 108a-d and a second group comprising a direction pad made up of buttons 108e-h. Input is received from the gamepad 102 when one or more buttons 108a-h are depressed, and a signal indicative of the received input is received. The gamepad 102 also comprises a plurality of proximity sensors, in this example capacitance sensors 110a-h, each of which is located proximate to a button 108a-h. In this example, one proximity sensor is associated with each button; however, in some examples (not shown) there may be more than one proximity sensor associated with each input element of an input device. In some examples, there may be different numbers of proximity sensors associated with different types of input elements; for example, a button may have one proximity sensor associated with it, and a stick may have two proximity sensors associated with it. When a digit, or finger, is near a capacitance sensor 110a-h, a signal is generated. The signal generated by the proximity sensor indicates that an object is relatively close to the proximity sensor. As the position of the capacitance sensors 110a-h is known, an intended button to be pressed may be identified. Again, the processing associated with identifying an intended button may be processed by a processing unit integral to the gamepad, or the generated signals may be transmitted to the computing device that the gamepad is controlling and processed at that computing device in order to help determine an intended button press before a button is actually pressed. In another example, the processing may take place at another computing device, such as a cloud server. Processing the signal at a cloud server may be advantageous in some usage scenarios, such as cloud gaming (for example, GeForce NOW cloud gaming) or Internet based competitions. In some examples, the EMG signal processing occurs in stages, and any stage may occur at the muscle activity sensor device, the input device, the computing device to which the input device is connected and/or a remote computing device. In some examples, the muscle activity sensor device is an EMG sensor device, the input device is a gamepad and/or controller, the computing device is a gaming console, and the remote computing device is a remote server, such as a cloud server. The signal transmitted by the muscle activity sensor, such as an EMG sensor, may range from an unfiltered raw signal to a processed signal that is ready to analyze. The transmitted signal from the EMG sensor may also, or alternatively, comprise a simple "start signal detected" flag. A lower signal latency may be achieved by processing the signal earlier in the pipeline, for example via a processing chip in the EMG sensor device as opposed to processing the signal at a computing device connected to the input device, such as a gaming console connected to a gamepad.

One or more EMG sensors may be used to detect the onset of muscle contraction that precedes an interaction (i.e., a start signal) with an input element of an input device, such as a button press, and it may be identified which digit, or finger, is being used to interact with the input element. Upon detecting the start signal, the active digit and intended input element may be identified such as, for example, the button a user's finger is hovering over. If the user's digit is between input elements, or moves away from the closest input element, EMG data may be used to predict digit movement based on muscle activity to identify the intended input element. If an intended input element cannot be identified using EMG data alone, data from one or more proximity sensors, associated with one or more respective input elements of an input device, may be used to construct a digit trajectory to predict the intended input element interaction. Upon meeting a confidence threshold, the targeted input element may be activated (i.e., a signal generated at the input device) before the physical interaction takes place. In further examples, one or more grip sensors associated with the input device may be utilized to improve the detectability and signal quality of start signals by enabling EMG noise associated with the strength and location of grip to be filtered out. In some examples, detecting a start signal directly at the source (e.g., the muscle activity), rather than waiting for a physical interaction with an input element may reduce input delay by up to 70 ms.

After identifying a start signal, a system, or application running on a computing device may identify which input element, such as a button, the user intends to interact with. A user interaction with an input element may be, for example, a button press. Different input elements may have different types of possible input, including, for example, binary (i.e., off/on), continuous (non-pressed to pressed), directional (i.e., thumb stick rotation), or a combination thereof. The input may be filtered by, for example, a control scheme and/or state associated with an application running on a computing device. For example, in a gaming application, an X button may be used to provide a continuous input when driving a vehicle, but to provide a binary input when reloading. One or more proximity sensors may provide a real-time indicator of digit, or finger, position, which may be compared to a 3D model of the input element locations of the input device in order to identify the closest input element. Each input element may be assigned a confidence level based on identified digit position, as determined by the processed signals of the one or more proximity sensors. The system may analyze EMG signals to identify a start signal, at which point the system may attempt to identify a specific type of digit movement (e.g., a thumb press vs. a thumb raise). Upon detecting a relevant finger movement via EMG, the system may calculate a confidence level for each potential user interaction with an input element. If the confidence for a given interaction with an input element exceeds a threshold value, the system may activate the targeted input instead of waiting for a physical interaction with an input element.

If the distance to the nearest input element, or button, is above a threshold, or the difference between input elements is below a threshold, a finger movement prediction (i.e., the thumb press vs. the thumb raise) via EMG may not be sufficient to accurately predict an interaction with an input element. In another example, a detected finger movement may not correspond to a predicted interaction with an input element. For example, a user's thumb may be hovering over an X button of an input device, and the user may decide that they need to press a different button instead, so rather than lowering their thumb (indicating X as the target input), the user may raise it instead to move it towards the newly intended button. In both examples, the system may attempt to identify the intended input by identifying the activation of muscle groups corresponding to distinct finger movement directions. For example, a user moving their thumb from the X button to an O button of an input device would activate a distinct set of muscles from those used to move the thumb to the square or triangle buttons of an input device. Additionally, or alternatively (in combination or sequence), the system may use proximity sensor data to track movement of a relevant digit and identify the velocity of the digit. The system may identify a direction, and/or it may construct a curved trajectory, in some examples, influenced by previously identified finger movement patterns, and the locations of the input elements of an input device. Muscle activity sensors, such as EMG sensors, may have a lower latency than proximity sensors. In some examples, a first signal may be received from a proximity sensor and, on identifying that a confidence level associated with a first prediction is below a threshold, a second signal may be received from a muscle activity sensor. The order of sensor selection (i.e., to start with a muscle activity sensor or a proximity sensor) may be based on a determined measure of signal quality. For example, if a user's hands are sweaty, then an muscle activity sensor signal may become unreliable, and the input from a proximity sensor signal may be prioritized. This determination may take place, for example, by comparing received signals to stored signal calibration data.

Figure 2:
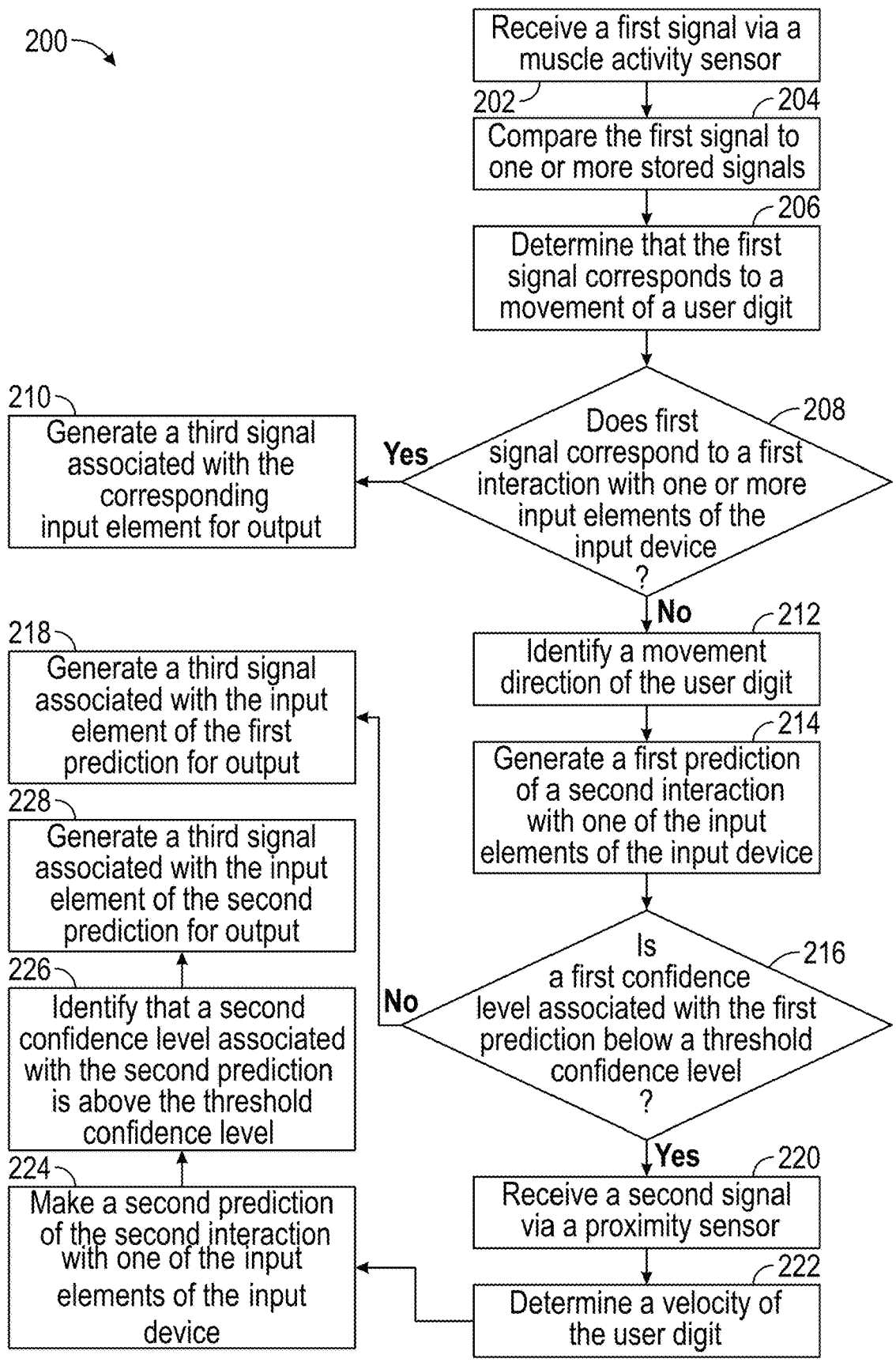
FIG. 2 shows a flowchart of illustrative steps for enabling an improved input device, in accordance with some embodiments of the disclosure.

FIG. 2 shows a flowchart of illustrative steps for enabling an improved input device, in accordance with some embodiments of the disclosure. Process 200 may be implemented, in whole or in part, on any of the computing devices mentioned herein. In addition, one or more actions of the process 200 may be incorporated into or combined with one or more actions of any other processes or embodiments described herein.

At step 202, a first signal is received via a muscle activity sensor as discussed herein. At step 204, the first signal is compared to one or more stored signals, and at step 206, it is determined that the first signal corresponds to a movement of a user digit, such as a finger. In some examples, a signal may be noise or associated with movement of a user arm, and may not be relevant to determining an interaction with an input element of an input device. At step 208, it is determined whether the first signal corresponds to a first interaction with one or more input elements of the input device. The determination may utilize the one or more stored signals to determine whether the first signal corresponds to a first interaction with one or more input elements of the input device. The one or more stored signals may be typical signals associated with a button press. For example, a first stored signal may be associated with moving a finger to press an "A" button on a gamepad, and a second stored signal may be associated with moving a finger to press a "B" button on a gamepad. The stored signals may be generated for a particular user, for example, during a calibration phase where a user is asked to interact with each input element on an input device a plurality of times. The signals generated while a user is interacting with a known input element may then be captured, for example, via a muscle activity sensor, and stored, for example, associated with a user profile for that user. The user profile may be stored at a remote location, such as in the cloud, and may be associated with, for example, a particular application or program running on a computing device. When the user logs in to their user profile on computing device, the stored signals may be downloaded from the remote device and be used on that computing device. If, at step 208, it is determined that the first signal corresponds to a first interaction with one or more input elements of the input device, then the process proceeds to step 210, where a third signal associated with the corresponding input element is generated for output at the input device. Typically, this third signal is transmitted to a computing device that the input device is connected to. If, at step 208, it is determined that the first signal does not correspond to a first interaction with one or more input elements of the input device, then the process proceeds to step 212.

At step 212, a movement direction of the user digit is identified. The identification of a movement direction of the user digit may be based on, for example, the one or more stored signals, at least a subset of which may be associated with different movement directions of user digits. At step 214, a first prediction of a second interaction with one of the input elements of the input device is generated. The generation of the first prediction may be based on, for example, a movement of a user digit associated with a particular region of a user input device such as, for example, a left hand region. The left hand region may comprise a directional-pad (d-pad) comprising a plurality of input elements for providing directional input, such as up, down, left, right, which may result in a prediction, having an associated confidence level, that the user is about to select a button on the d-pad; however, the confidence level may be low because a d-pad typically comprises four buttons, and the first signal may not give a strong indication of which button is about to be selected by a user.

At step 216, it is determined whether a first confidence level associated with the first prediction is below a threshold confidence level. If, at step 216, it is determined that the first confidence level is not below the threshold confidence level, then the process proceeds to step 218, where a third signal associated with the corresponding input element is generated for output at the input device. Again, this third signal is typically transmitted to a computing device that the input device is connected to. If, at step 216, it is determined that the first confidence level is below the threshold confidence level, then the process proceeds to step 220, where a second signal is received via a proximity sensor as discussed herein. Typically, at least one proximity sensor is associated with an input element of the input device. At step 222, a velocity of the user digit is determined based on the output of the proximity sensor. The generated signal, or signals, from the proximity sensor may be processed by a processing unit integral to the gamepad, or the generated signals may be transmitted to the computing device that the gamepad is controlling and processed at that computing device in order to determine a velocity of a user digit. In another example, the processing may take place at another computing device, such as a cloud server. At step 224, a second prediction of the second interaction with one of the input elements of the input device is made, and at step 226 it is identified that a second confidence level associated with the second prediction is above the threshold confidence level. The increase in confidence level may arise as the prediction is based on the first signal from the muscle activity sensor and the second signal from the proximity sensor, thereby giving more data on which to make the second prediction. At step 228, a third signal associated with the input element of the second prediction is generated for output. In this manner, the user input device enables input to be predicted and transmitted to a computing device before it is physically received, enabling an improved efficiency of the input device, not least because the delay associated with actually moving a digit in response to a muscle signal is reduced.

Figure 3:
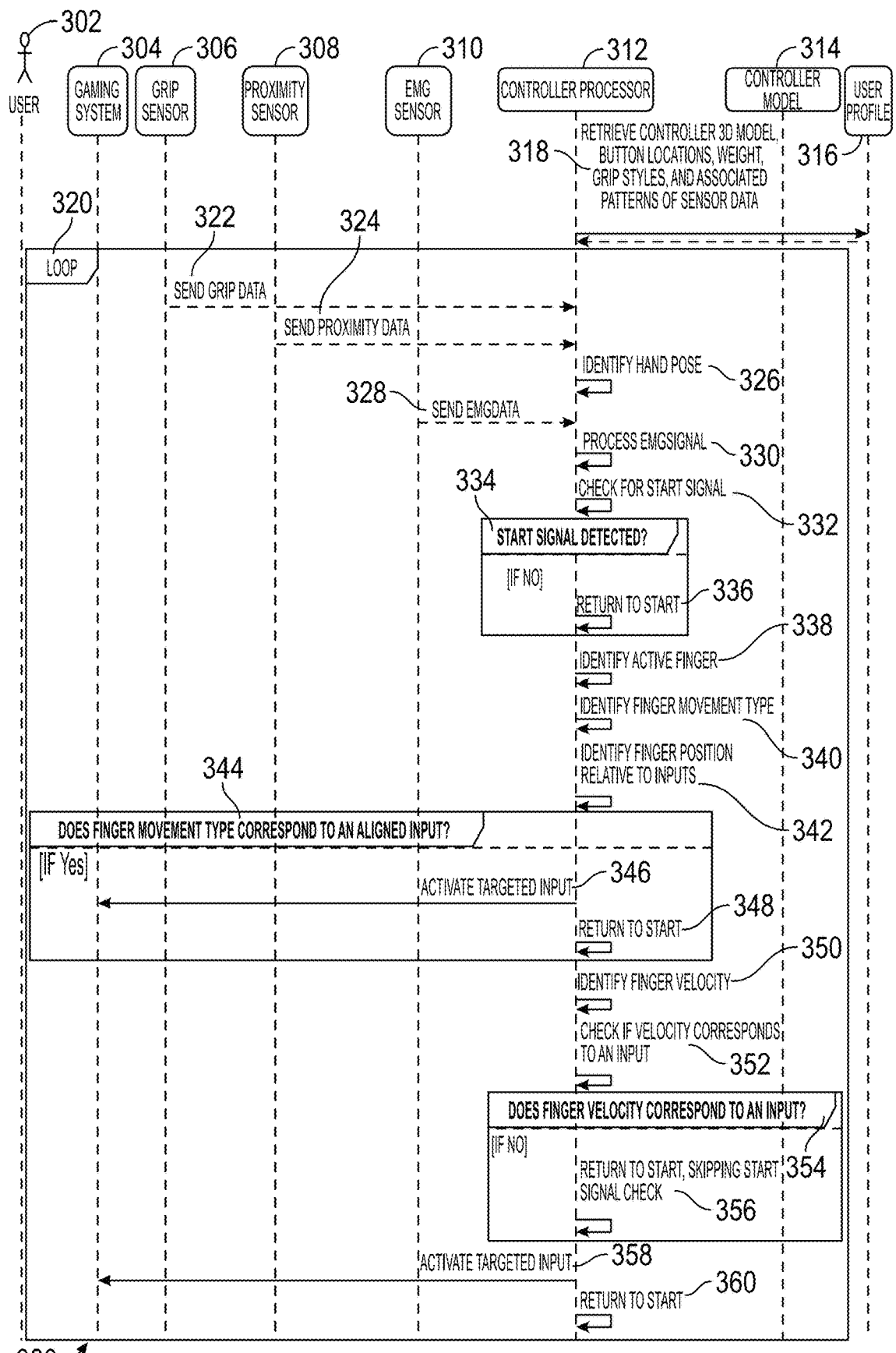
FIG. 3 shows a flow diagram of illustrative steps for enabling an improved input device, in accordance with some embodiments of the disclosure.

FIG. 3 shows a flow diagram of illustrative steps for enabling an improved input device, in accordance with some embodiments of the disclosure. Process 300 may be implemented, in whole or in part, on any of the computing devices mentioned herein. In addition, one or more actions of the process 300 may be incorporated into or combined with one or more actions of any other processes or embodiments described herein.

The environment 300 comprises a user 302, a computing device, such as gaming system 304, a grip sensor 306, a proximity sensor 308, a muscle activity sensor, such as an EMG sensor 310, a controller processor 312, a controller model 314 and a user profile 316. At step 318, the controller processor 312 retrieves data, such as a controller 3D model, button locations, a controller weight, controller grip styles and associated patterns of sensor data, from a user profile 316. This data may be used with the other examples described herein. Following the retrieval of the data at step 318, a loop 320 is entered. At 322, the grip sensor 306 transmits grip data to the controller processor 312, and at 324, the proximity sensor 308 transmits proximity data to the controller processor 312. At 326, the controller processor 312 uses the data retrieved at step 318, the received grip data and the received proximity data to identify a hand pose of a user. At step 328, the EMG sensor 310 transmits EMG data to the controller processor 312, and at step 330, the controller processor 312 processes the EMG. At 332, the controller processor 312 checks the processed EMG signal for a start signal. At 334, it is identified whether a start signal is detected. If a start signal has not been detected, the process returns 336 to step 322, at the start of loop 320. If a start signal has been detected, the process proceeds to step 338, where an active finger (or digit) of the user is identified. At step 340, a movement type of the identified finger is identified, and a step 342, the finger position relative to the input elements of the input device is identified.

At step 344, it is determined whether a finger movement type corresponds to an aligned input. If, at step 344, it is determined that the finger movement type corresponds to an aligned input, then, at step 346, the targeted input is activated, and at step 348, the process returns to step 322, at the start of loop 320. If, at step 344, it is determined that the finger movement type does not correspond to an aligned input, then the process proceeds to step 350, where a finger velocity is identified. At step 352, it is checked whether a velocity corresponds to an input at the input device. At step 354, if it is determined that the velocity does not correspond to an input at the input device, then the process proceeds to step 356, where the process returns to step 322, at the start of loop 320, but on this loop, step 332, check for a start signal, is skipped. If, at 354, it is determined that the velocity does correspond to an input at the input device, then the process proceeds to step 358, where the targeted input is activated. At step 360, the process returns to step 322, at the start of loop 320.

Figure 4:
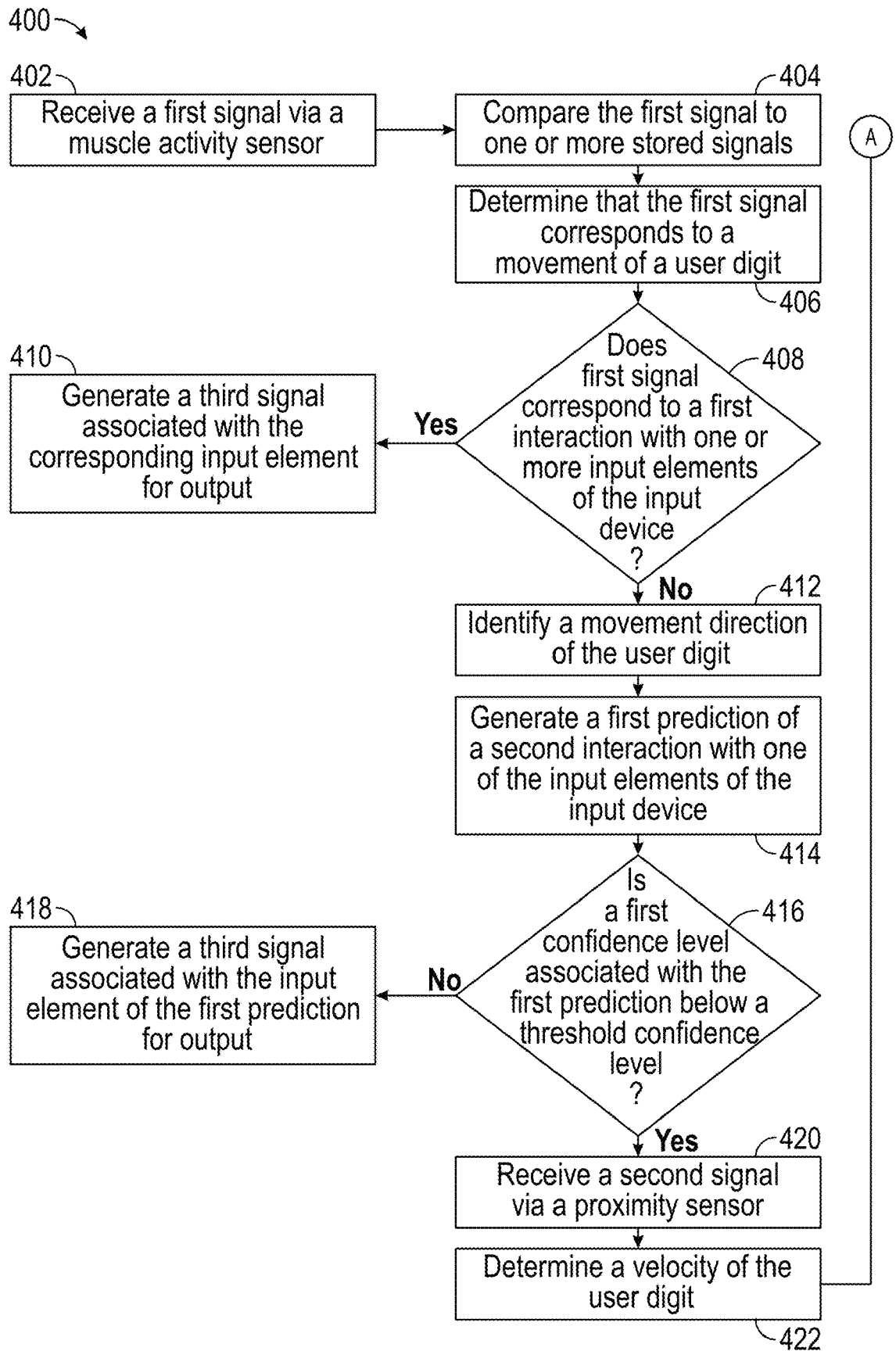
FIG. 4 shows another flowchart of illustrative steps for enabling an improved input device, in accordance with some embodiments of the disclosure.
Figure 4:
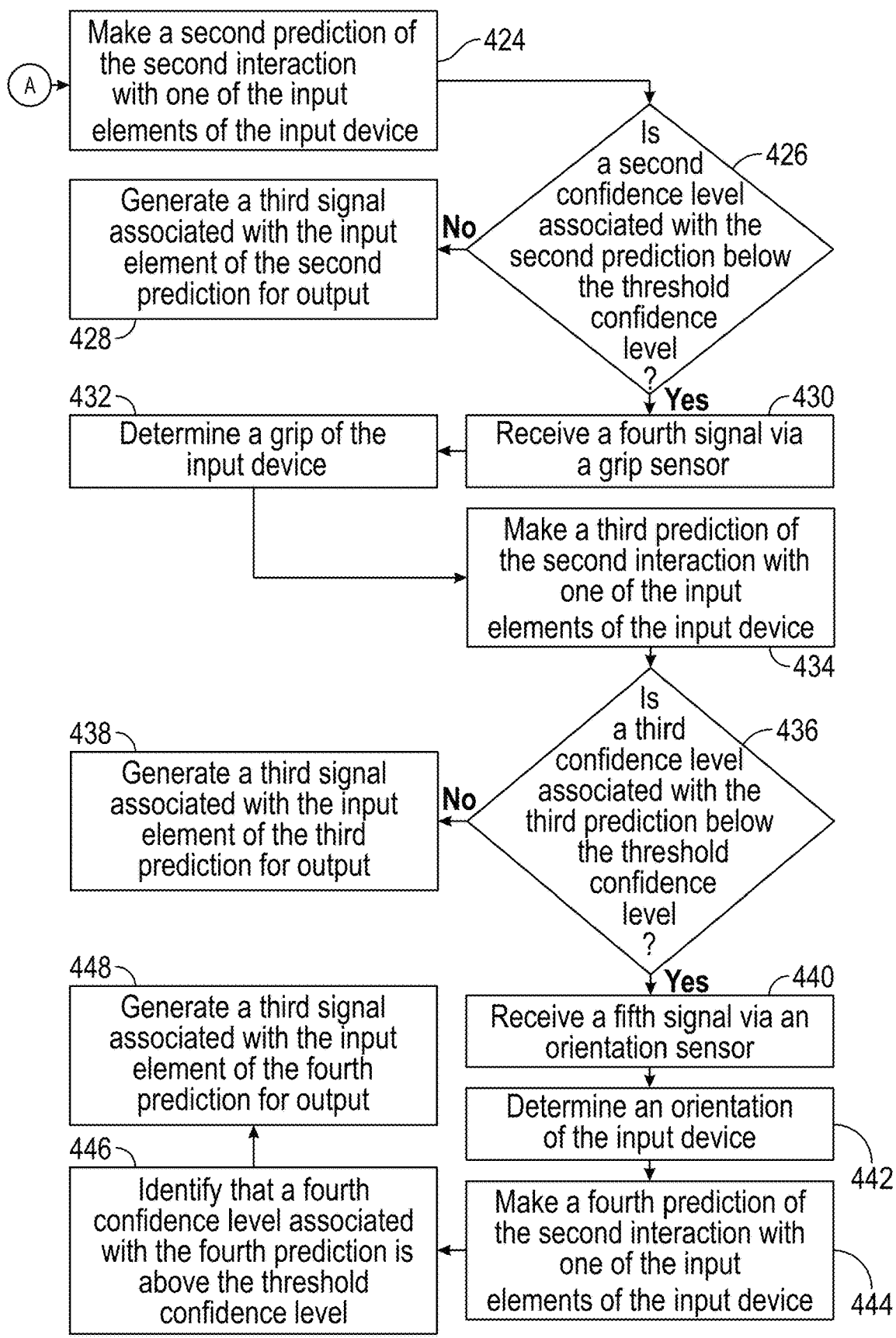

FIG. 4 shows another flowchart of illustrative steps for enabling an improved input device, in accordance with some embodiments of the disclosure. Process 400 may be implemented, in whole or in part, on any of the computing devices mentioned herein. In addition, one or more actions of the process 400 may be incorporated into or combined with one or more actions of any other processes or embodiments described herein.

At step 402, a first signal is received via a muscle activity sensor, as described herein, and at step 404, the first signal is compared to one or more stored signals, as described herein. At step 406, it is determined that the first signal corresponds to a movement of a user digit, as described herein. At step 408, it is determined whether the first signal corresponds to a first interaction with one or more input elements of the input device, as described herein. If, at step 408, it is identified that the first signal does correspond to a first interaction with one or more input elements of the input device, then the process proceeds to step 410, where a third signal associated with the corresponding input element is generated for output, and is typically transmitted to a computing device. If, at step 408, it is identified that the first signal does not correspond to a first interaction with one or more input elements of the input device, then the process proceeds to step 412, where a movement of direction of the user digit is identified as described herein. At step 414, a first prediction of a second interaction with one of the input elements of the input device is generated.

At step 416, it is identified whether a first confidence level associated with the first prediction is below a threshold confidence level. If, at step 416, it is identified that the first confidence level associated with the first prediction is not below the threshold confidence level, then the process proceeds to step 418, where a third signal associated with the input element of the first prediction is generated for output, and is typically transmitted to a computing device. If, at step 416, it is identified that the first confidence level associated with the first prediction is below the threshold confidence level, then the process proceeds to step 420, where a second signal is received via a proximity sensor, as described herein, and at step 422 a velocity of the user digit is determined, as described herein. At step 424, a second prediction of the second interaction with one of the input elements of the input device is generated. This second prediction is based on the first signal received from the muscle activity sensor and the second signal received from the proximity sensor, thereby giving more data on which to make the second prediction when compared to the first prediction made on the signal received from the muscle activity sensor alone.

At step 426, it is identified whether a second confidence level associated with the second prediction is below the threshold confidence level. If, at step 426, it is identified that the second confidence level associated with the second prediction is not below the threshold confidence level, then the process proceeds to step 428, where a third signal associated with the input element of the second prediction is generated for output, and is typically transmitted to a computing device. If, at step 426, it is identified that the second confidence level associated with the second prediction is below the threshold confidence level, then the process proceeds to step 430, where a fourth signal is received via a grip sensor. The grip sensor may be integral to an input device or external to an input device. The signals generated by the grip sensor may be processed by a processing unit integral to an input device, or the generated signals may be transmitted to the computing device that the input device is controlling, and processed at that computing device. In another example, the signals may be processed at another computing device, such as a cloud server. At step 432, a grip of the input device is determined based on the output of the grip sensor. Different grips are discussed in connection with FIG. 5 below. At step 434, a third prediction of a second interaction with one of the input elements of the input device is generated. This third prediction is based on the first signal received from the muscle activity sensor, the second signal received from the proximity sensor and the fourth signal received from the grip sensor, thereby giving more data on which to make the third prediction when compared to the first and second predictions.

At step 436, it is identified whether a third confidence level associated with the third prediction is below the threshold confidence level. If, at step 436, it is identified that the third confidence level associated with the third prediction is not below the threshold confidence level, then the process proceeds to step 438, where a third signal associated with the input element of the third prediction is generated for output, and is typically transmitted to a computing device. If, at step 436, it is identified that the third confidence level associated with the third prediction is below the threshold confidence level, then the process proceeds to step 440, where a fifth signal is received via an orientation sensor, such as an IMU. The orientation sensor may be integral to an input device or external to an input device. The signals generated by the orientation sensor may be processed by a processing unit integral to an input device, or the generated signals may be transmitted to the computing device that the input device is controlling, and processed at that computing device. In another example, the signals may be processed at another computing device, such as a cloud server. At step 442, an orientation of the input device is determined based on the output of the orientation sensor. At step 444, a fourth prediction of a second interaction with one of the input elements of the input device is generated. This fourth prediction is based on the first signal received from the muscle activity sensor, the second signal received from the proximity sensor, the fourth signal received from the grip sensor and the fifth signal received from the orientation sensor, thereby giving more data on which to make the fourth prediction when compared to the previous predictions. At step 446, it is identified that a fourth confidence level associated with the fourth prediction is above the threshold confidence level, and at step 448, a third signal associated with the input element of the fourth prediction is generated for output, and is typically transmitted to a computing device.

There is more than one way to hold an input device as shown in FIGS. 5A-5D and as described below. For example, some users will use a traditional grip style for each controller; however, some users will use a different grip style consistently, and some users may use different grip styles for different applications, such as games or game sections that rely on different input element combinations, such as different button combinations.

FIGS. 5A-5D show example user grips of an input device. In these examples, the input device is a gamepad 500. The gamepad 500 is held by a first hand 502a-d and a second hand 504a-d in each example. The gamepad comprises a first stick 506, a second stick 508, a directional pad (or d-pad) comprising first to fourth buttons 510-516, first to fourth shoulder buttons 518-524 and an action pad comprising fifth to eighth buttons 526-532.

Figure 5B:
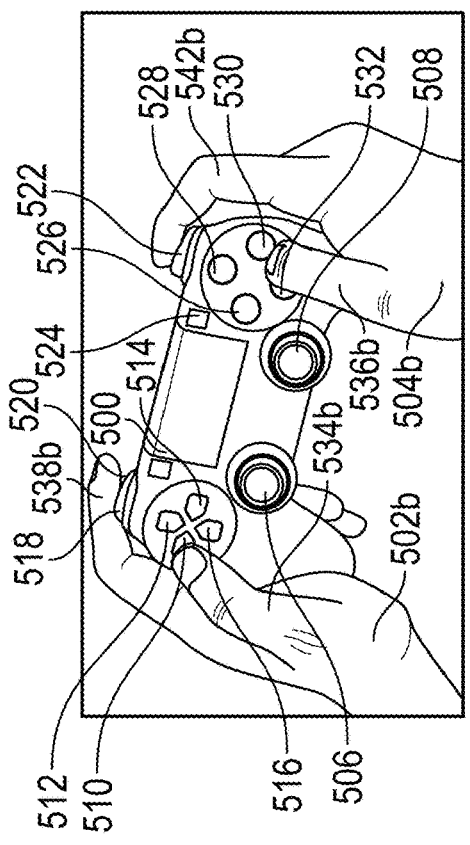
FIG. 5B shows another example user grip of an input device.
Figure 5D:
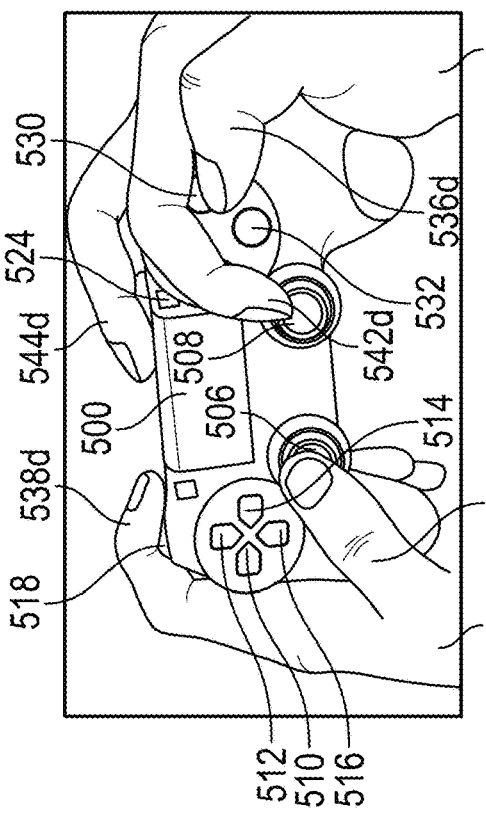
FIG. 5D shows another example user grip of an input device.
Figure 5A:
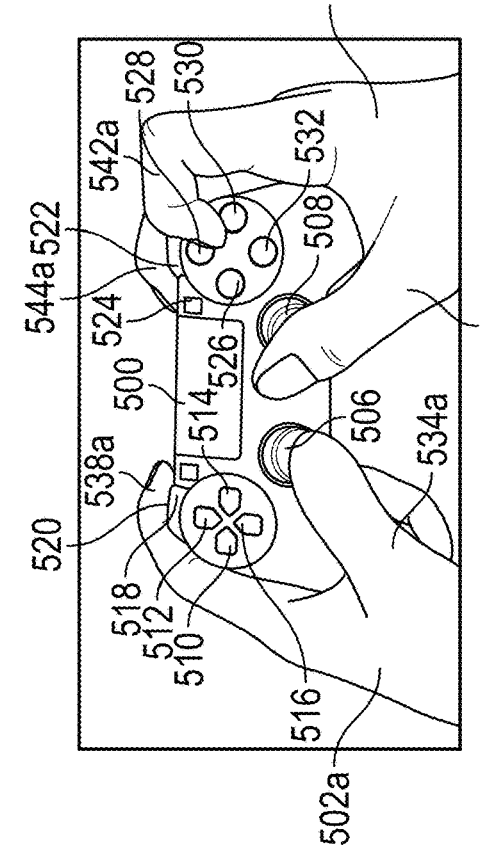
FIG. 5A shows an example user grip of an input device.

In FIG. 5A, a first thumb 534a of a first hand 502a interacts with the first stick 506, and a first index finger 538a of the first hand 502a interacts with the second shoulder button 520. A second thumb 536a of a second hand 504a interacts with the second stick 508, a second index finger 542a of the second hand 504a interacts with the seventh button 530 of the action pad, and a middle finger 544a of the second hand 504a interacts with the fourth shoulder button 524. In this example grip, the respective thumbs 534a, 536a of each hand 502a, 504a are used to control the respective first and second sticks 506, 508. The first index finger 538a of the first hand 502a is used to control the first and second shoulder buttons 518, 520. The second index finger 542a of the second hand 504a is used to control the fifth to eighth buttons 526-532, and the middle finger 544a of the second hand 504a is used to control the third and fourth shoulder buttons 522, 524.

In FIG. 5B, a first thumb 534b of a first hand 502b interacts with the second button 510 of the directional pad, and a first index finger 538b of the first hand 502b interacts with the second shoulder button 520. A second thumb 536b of the second hand 504b interacts with the seventh button 530 of the action pad, and a second index finger 542b of the second hand 504b interacts with the fourth shoulder button 524. In this example grip, the first thumb 534b of the first hand 502b is used to interact with the first to fourth buttons 510-516 of the directional pad, and the second thumb 536b of the second hand 504b is used to interact with the fifth to eighth buttons 526-532 of the action pad. The first index finger 538b of the first hand 502b is used to control the first and second shoulder buttons 518, 520, and the second index finger 542b of the second hand 504b is used to control the third and fourth shoulder buttons 522, 524. This may represent a traditional grip style for this input device 500.

Figure 5C:
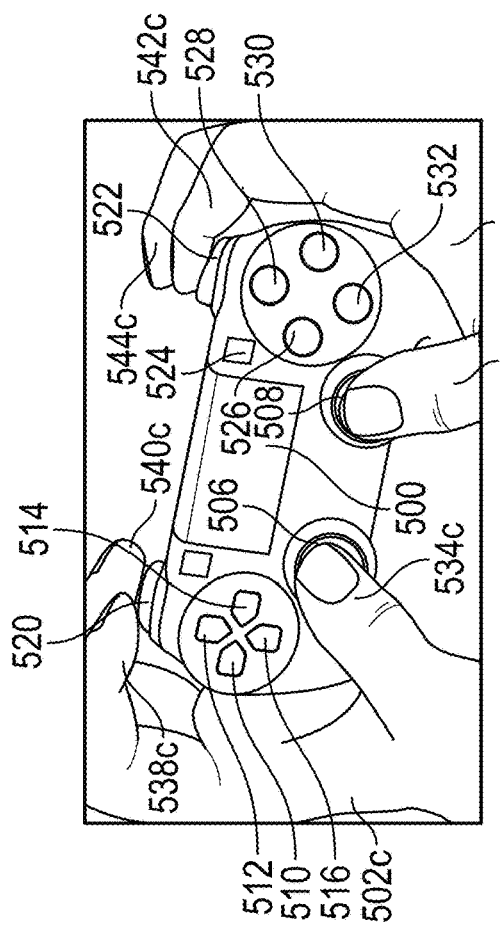
FIG. 5C shows another example user grip of an input device.

In FIG. 5C, a first thumb 534c of a first hand 502c interacts with the first stick 506, a first index finger 538c of the first hand 502c interacts with the first shoulder button 518, and a first middle finger 540c of the first hand 502c interacts with the second shoulder button 520. A first thumb 536c of a second hand 504c interacts with the second stick 508, a second index finger 542c of the second hand 504c interacts with the third shoulder button 522, and a second middle finger 544c of the second hand 504c interacts with the fourth shoulder button 524. In this example grip, the respective thumbs 534c, 536c of each hand 502c, 504c are used to control the respective first and second sticks 506, 508. The first index finger 538c and the first middle finger 540c of the first hand 502c are used to control the first and second shoulder buttons 518, 520, and the second index finger 542c and the second middle finger 544c of the second hand 504c are used to control the third and fourth shoulder buttons 522, 524. This grip style may enable concurrent shoulder button 518, 520, 522, 524 presses.

In FIG. 5D, a first thumb 534d of a first hand 502d interacts with the first stick 506, and a first index finger 538d of the first hand 502d interacts with the second shoulder button 520. A second thumb 536d of a second hand 504d interacts with the seventh button 530 of the action pad, a second index finger 542d of the second hand 504d interacts with the second stick 508, and a middle finger 544d of the second hand 504d interacts with the fourth shoulder button 524. In this example grip, the first thumb 534d of the first hand 502d and the second index finger 542d of the second hand 504d are used to control the respective first and second sticks 506, 508. The first index finger 538d of the first hand 502d is used to control the first and second shoulder buttons 518, 520, and the middle finger 544d of the second hand 504d is used to control the third and fourth shoulder buttons 522, 524. The second thumb 536d of the second hand 504d is used to control the fifth to eighth buttons 526-532 of the action pad.

To enable greater accuracy of user hand pose and input element identification, a user may complete a calibration session in which they are instructed to hold the input device, such as a controller, in a preferred position (i.e., a preferred grip style), and interact with input elements, such as pressing buttons, button combinations, or button sequences to identify patterns of grip, proximity, and EMG sensor data corresponding to different inputs and hand poses. The user may also be instructed to squeeze various portions of the input device, or to hold the input device at different orientations to better characterize competing EMG signals associated with different grip sensor values.

Figure 6:
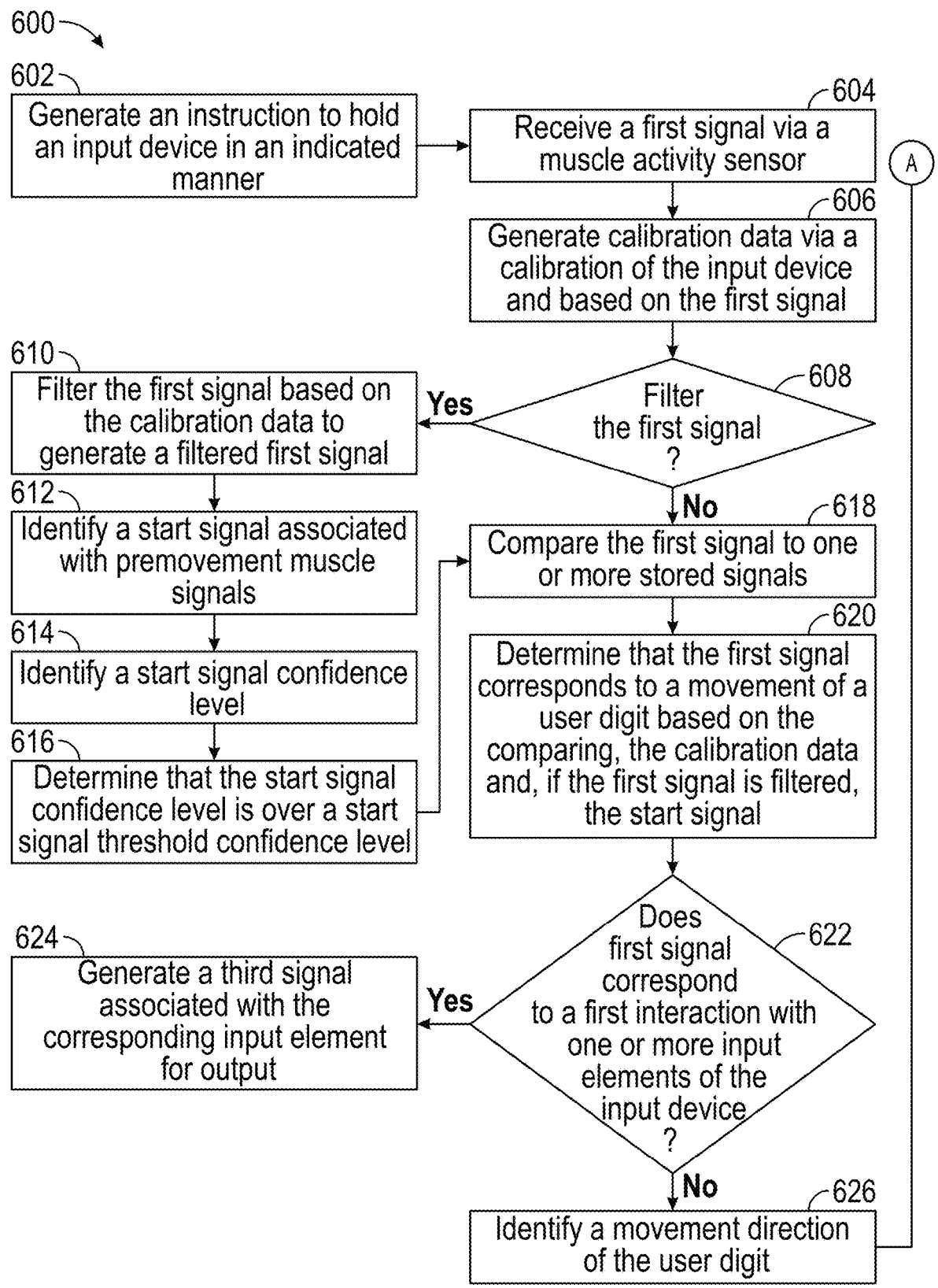
FIG. 6 shows another flowchart of illustrative steps for enabling an improved input device, in accordance with some embodiments of the disclosure.
Figure 6:
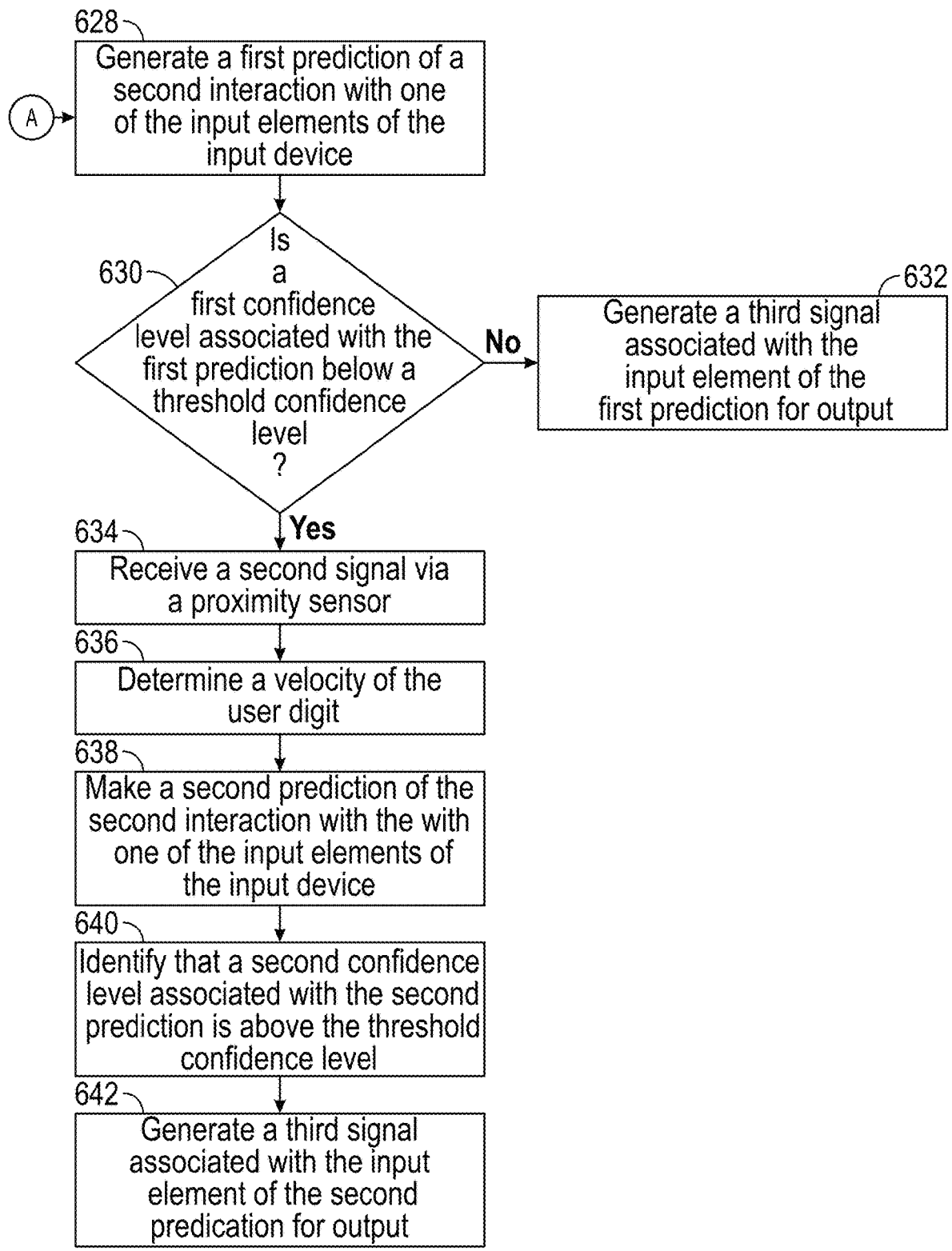

FIG. 6 shows another flowchart of illustrative steps for enabling an improved input device, in accordance with some embodiments of the disclosure. Process 600 may be implemented, in whole or in part, on any of the computing devices mentioned herein. In addition, one or more actions of the process 600 may be incorporated into or combined with one or more actions of any other processes or embodiments described herein.

At step 602, an instruction to hold an input device, such as a gamepad, in an indicated manner is generated. For example, an instruction to hold an input device in one of the grips shown in FIGS. 5A-5D may be generated. This instruction may be generated at a computing device that the input device is connected to, and may be output, for example, displayed at a screen attached to the computing device. In other examples, an audio cue may be output via a speaker connected to the computing device. In further examples, the input device may comprise an integral display, such as an LCD display, and visual grip instructions may be output via the integral display. In other examples, the input device may additionally, or alternatively, comprise a speaker, and the grip instructions may be output via the speaker. In some examples, the instructions may be generated at the computing device, and may be transmitted to the input device for output.

At step 604, a first signal is received via a muscle activity sensor, as described herein. At step 606, calibration data is generated via a calibration of the input device and based on the first signal. For example, the calibration data may be generated based on the generated instruction for a particular grip, and the received signal, enabling a particular signal to be associated with a particular grip so that when the same, or similar, signal is received at a future time, it may be associated with that grip. At step 608, it is determined whether the first signal should be filtered. This determination may be based on identifying whether a threshold amount of noise is associated with the received first signal and/or whether during the generation of the calibration data, it is identified that a threshold amount of noise is associated with the received first signal. This determination may be based on it being difficult to identify, for example, a start signal associated with premovement muscle signals in the received first signal. If, at step 608, it is identified that the first signal is to be filtered, then the process proceeds to step 610.

At step 610, the first signal is filtered based on the calibration data to generate a filtered first signal. At step 612, a start signal associated with premovement muscle signals is identified, and at step 614, a start signal confidence level is identified. At step 616, it is determined that that the start signal confidence level is over a start signal threshold confidence level, and the process proceeds to step 618. At step 608, if it is determined that the first signal is not to be filtered, then the process proceeds to step 618.

At step 618, the first signal is compared to one or more stored signals, and at step 620, it is determined that the first signal corresponds to a movement of a user digit, such as a finger, based on the comparing, the calibration data and, if the first signal is filtered, the start signal. At step 622, it is determined whether the first signal corresponds to a first interaction with one or more input elements of the input device, as described herein. If, at step 622, it is determined that the first signal corresponds to a first interaction with one or more input elements of the input device, then the process proceeds to step 624, where a third signal associated with the corresponding input element is generated for output at the input device. Typically, this third signal is transmitted to a computing device that the input device is connected to. If, at step 622, it is determined that the first signal does not correspond to a first interaction with one or more input elements of the input device, then the process proceeds to step 626.

At step 626, a movement direction of the user digit is identified, as described herein. At step 628, a first prediction of a second interaction with one of the input elements of the input device is generated, as described herein. At step 630, it is determined whether a first confidence level associated with the first prediction is below a threshold confidence level. If, at step 630, it is determined that the first confidence level is not below the threshold confidence level, then the process proceeds to step 632, where a third signal associated with the corresponding input element is generated for output at the input device. Again, this third signal is typically transmitted to a computing device that the input device is connected to. If, at step 630, it is determined that the first confidence level is below the threshold confidence level, then the process proceeds to step 634, where a second signal is received via a proximity sensor as discussed herein. Typically, at least one proximity sensor is associated with an input element of the input device. At step 636, a velocity of the user digit is determined based on the output of the proximity sensor, as discussed herein. At step 638, a second prediction of the second interaction with the one of the input elements of the input device is made, and at step 640, it is identified that a second confidence level associated with the second prediction is above the threshold confidence level. The increase in confidence level may arise as the prediction is based on the first signal from the muscle activity sensor and the second signal from the proximity sensor, thereby giving more data on which to make the second prediction. At step 642, a third signal associated with the input element of the second prediction is generated for output. In this manner, the user input device enables input to be predicted and transmitted to a computing device, before it is physically received, enabling an improved efficiency of the input device, not least because the delay associated with actually moving a digit in response to a muscle signal is reduced.

In some examples, an input device may be modelled by an input device model component. The input device model may comprise a list of input device grip styles and their corresponding patterns of grip; proximity; and muscle activity, such as EMG, sensor data. The input device model may also comprise a single weight value for the input device, or a weight distribution, as weight affects required muscle activity. Such data may be provided by an input device manufacturer, constructed from scratch from user usage history, or provided by the manufacturer and modified based on user data. Identifying a user's grip style may enable a baseline pattern of sensor data to be established in order to improve current hand pose detection, rather than starting from scratch. When an application, such as a game, is running, a processor of the input device may be utilized to identify a user grip style and to determine a current hand pose by analyzing data from muscle activity and proximity sensors. Such analysis may be supplemented by other available sensors such as optical cameras.

The system may use current controller orientation to improve muscle activity digit, such as finger, movement classification accuracy. Digit orientation affects required muscle activity because gravity may exert an opposite influence if, for example, a user hand is turned over. The input device processor may poll, or check, for changes in hand position at a static rate, at a dynamic rate corresponding to a current framerate of an application running on a computing device associated with the input device, or triggered following in-application, such as in-game, events (e.g., entering a vehicle with a different control scheme). Hand pose may also be identified as stable for a given user for a given application to further reduce the rate of checking for hand position change and/or to preclude such checks entirely. If, during application usage, a user uses an uncalibrated grip style, the system may prompt them to perform a corresponding calibration after a current session has ended.

When an application, such as a game, is running on a system, or computing device, the system may retrieve and process muscle activity, such as EMG, sensor data at the same rate as the grip and proximity sensors and/or at a different rate, depending on signal quality. The system may analyze each muscle activity sensor separately and/or the set of sensors as a whole to identify the rapid amplitude increase that marks a start signal. An input device processor may retrieve the current grip style and grip sensor data and compare it to comparable data collected during a user calibration to identify muscle activity, such as EMG, signals not associated with user inputs. The system may filter the muscle activity data to remove the identified signals, making it easier to identify user inputs. The input device processor may then monitor filtered muscle activity sensor data to identify appropriate increases in amplitude that indicate a start signal. The system may use a pre-set confidence threshold for start signal detection. If the confidence consistently falls below the threshold, the system may disable input identification and may prompt the user to perform additional calibration. The system may identify input predictions as valid or invalid based on subsequent user inputs and use this data to improve the accuracy of future predictions.

In an example, a computing device, such as a gaming system, may detect or predict that a user utilizing an input device and a muscle activity sensor has lower overall latency than a user not using a muscle activity sensor. The difference in latency between the two users may be calculated based on previously collected data from a specific user, estimated based on user hardware parameters (e.g., EMG vs. no EMG, wired vs. wireless internet, GPU model), or averaged from previously collected data from similar users. In some examples, a latency associated with a GPU model may be based on the processing power available to the GPU and/or the relative age of a GPU model. Upon detecting a sufficient latency difference between a muscle activity sensor user and a non-muscle activity sensor user, the system may allocate additional network resources to the non-muscle activity sensor user in an attempt to level the playing field in, for example, a gaming scenario, such as a competitive and/or multiplayer gaming scenario performed via a network, such as the internet. This approach may conserve network resources for the game provider while preventing an unfair advantage for the muscle activity sensor user that is utilizing an advantage of the methods and systems described herein.

A latency difference between the muscle activity sensor user or a non-muscle activity sensor user may be signaled to, for example, a gaming system or to a network service provider via an application programming interface (API). The network provider, upon receiving this indication, may compute and offer premium network latency performance to a non-muscle activity sensor user. Upon calling the API, a non-muscle activity sensor user latency may match, or get closer to, the latency of a muscle activity sensor user. In some examples, muscle activity sensor user may be excluded from this network-based offer; even if they are offered this network-based offer, additional overall latency benefits for the muscle activity sensor users may be computed and presented to them to make a decision to take up this offer from the network service provider or not. Furthermore, a network API may also reveal how much network latency matching capacity availability is left to all non-muscle activity sensor users, as that availability may change dynamically as latency performance offers are taken up by the non-muscle activity sensor users. The identity of a muscle activity sensor users may be revealed to the network service provider (including, for example, a gaming service provider) or, if they are not revealed, a count of a muscle activity sensor users in a particular location may be revealed to the network service provider by, for example, the gaming system. The identity of non-muscle activity sensor users taking up the offer for superior network latency performance may be revealed to the, for example, gaming system, which may specifically target that list to offer muscle activity sensor devices.

In another example, one or more of the examples described herein may be applied to input elements, such as buttons located on a vehicle steering wheel. Such a use case may utilize proximity sensors embedded in the steering wheel. Depending on the available input elements (e.g., paddles), additional movement patterns and their associated patterns of a muscle activity, such as EMG, data may be needed. The system may consider utilizing car acceleration to help account for a muscle activity sensor signal associated with a corresponding muscle activity.

In some other examples, an application, such as a game, may generate a scenario where timing matters, such as a scenario to evaluate how long it takes a user to aim at a certain virtual location using their mouse, or to hit a previously bound key (e.g., on a keyboard) and/or a series of keys repeatedly such as is, for example, required in a "quick time event." During the execution of such scenario, the application may evaluate how fast a user is able to perform a required action, and the application may adjust sensitivity and reaction time thresholds for these bindings automatically without the user having to navigate to "mouse sensitivity" or "game difficulty" menus. Button mashing during QTEs may be tolerated in applications, such as console games, where buttons are ergonomically designed to be mashed, whereas personal computer (PC) application users typically do not appreciate such button mashing, as keyboard keys are not designed to be mashed repeatedly. Such sensitivity adjustment/calibration scenarios may also be woven into introductory gameplay with little to no guidance to the user, as they are more geared toward assessing the player's ability to use the controls they selected.

Once a keymapping scenario has been run by a user, the application, such as a game, may record their key-binding playthrough and the associated key mapping, and that record may be made available for other users to visualize (in-game or on another platform, such as a gaming platform like Steam or a social media platform such as Facebook) and import for their own use.

Figure 7:
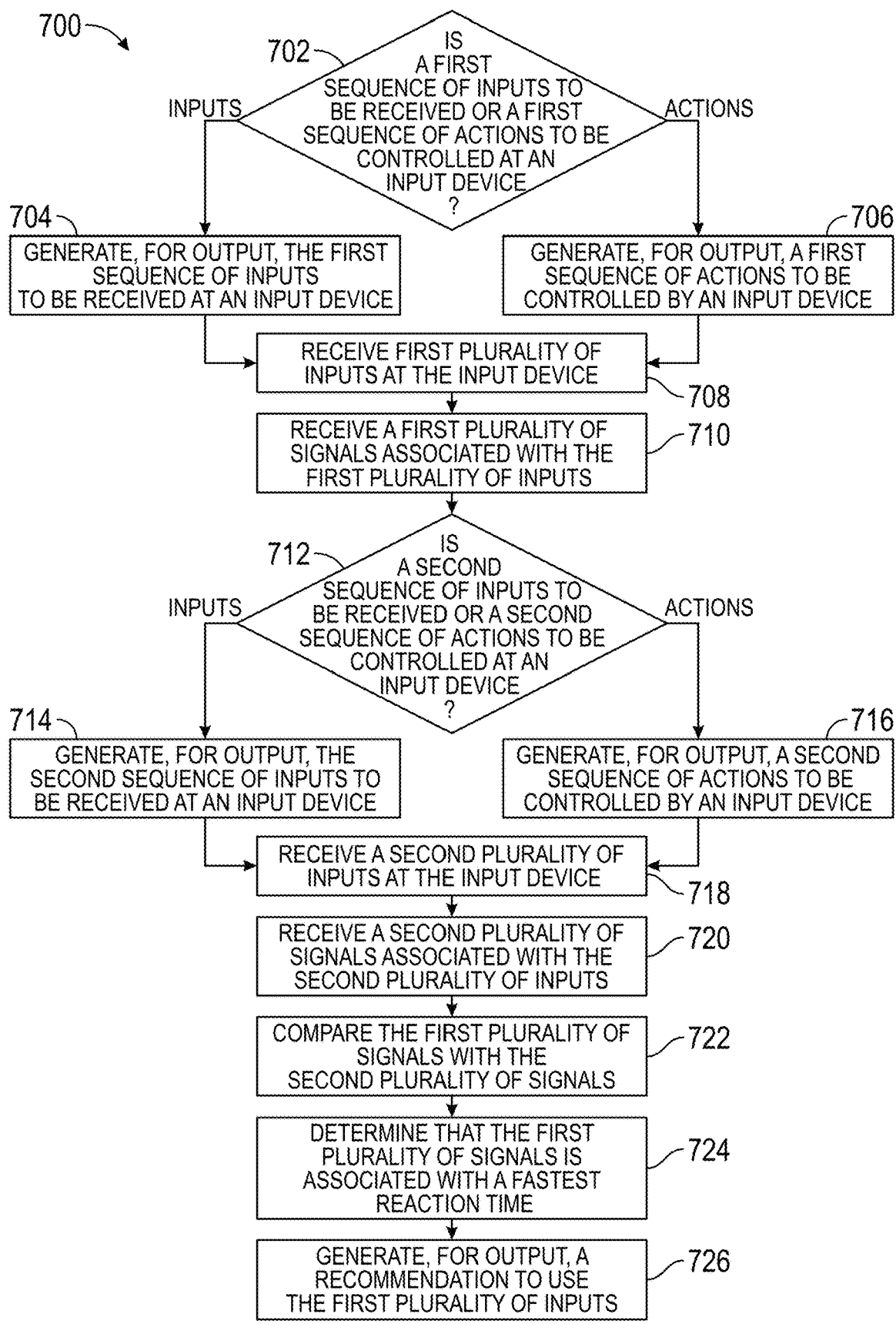
FIG. 7 shows a flowchart of illustrative steps for enabling improved input at an input device, in accordance with some embodiments of the disclosure.

FIG. 7 shows a flowchart of illustrative steps for enabling improved input at an input device, in accordance with some embodiments of the disclosure. Process 700 may be implemented, in whole or in part, on any of the computing devices mentioned herein. In addition, one or more actions of the process 700 may be incorporated into or combined with one or more actions of any other processes or embodiments described herein.

At step 702, it is determined whether a first sequence of inputs is to be received at an input device, or a first sequence of actions is to be controlled at the input device. A first sequence of inputs may comprise, for example, a sequence of buttons to be pressed, such as "left," "right shoulder button," "right," and "A." A sequence of actions may comprise, for example, a sequence of actions to be controlled at an application running on a computing device, such as "run," "jump," "duck," and "dodge." A user may choose a desired input element, or input elements, at the input device to control the action in response to the action being output. This determination between a first sequence of inputs or a first sequence of actions may be based, for example, on a setting set by an application running on a computing device and/or via a setting set in a user profile.

If, at step 702, it is determined that the first sequence of inputs is to be received, then the process proceeds to step 704, where the first sequence of inputs to be received at the input device is generated for output, for example, at a computing device. The computing device may generate for output at, for example, a display and/or via a speaker attached to the computing device, a sequence of inputs to be received via the input device. In another example, the sequence of inputs may be generated for output at the input device via, for example, an integral display and/or speaker. The input device may receive the sequence to be generated for output from the computing device. The process then proceeds to step 708.

If, at step 702, it is determined that the first sequence of actions is to be controlled, then the process proceeds to step 706, where the first sequence of actions to be controlled by the input device is generated for output, for example, at a computing device. The computing device may generate for output at, for example, a display and/or via a speaker attached to the computing device, the sequence of actions to be controlled via the input device. In another example, the sequence of actions may be generated for output at the input device via, for example, an integral display and/or speaker. The input device may receive the sequence to be generated for output from the computing device. In some examples, the sequence of actions may be received via controlling a character around a pre-determined virtual path, for example, a path that comprises the actions "run," "jump," "duck," and "dodge" to reach the end of the path. The process then proceeds to step 708.

At step 708, a first plurality of inputs are received at the input device. These inputs correspond to the first sequence of inputs or the first sequence of actions to be controlled as determined in step 702. At step 710, a first plurality of signals associated with the first plurality of inputs are received. This first plurality of signals may be received via, for example, a muscle activity sensor as described herein. At step 712, it is determined whether a second sequence of inputs is to be received at an input device, or a second sequence of actions is to be controlled at the input device. The second sequence of inputs may comprise, for example, a sequence of buttons to be pressed that is different from the first sequence of inputs. The second sequence of actions may comprise, for example, the same sequence of actions, but accompanied with a prompt for the user to use a different sequence of inputs to control the actions. Typically, this determination between the second sequence of inputs or the second sequence of actions is based on the selection determined in step 702, so that a comparison may be made between inputs based on sequences, or inputs based on actions.

If, at step 712, it is determined that the second sequence of inputs is to be received, then the process proceeds to step 714, where the second sequence of inputs to be received at the input device is generated for output, for example, at a computing device. The computing device may generate for output at, for example, a display and/or via a speaker attached to the computing device, a sequence of inputs to be received via the input device. In another example, the sequence of inputs may be generated for output at the input device via, for example, an integral display and/or speaker. The input device may receive the sequence to be generated for output from the computing device. The process then proceeds to step 718.

If, at step 712, it is determined that the second sequence of actions is to be controlled, then the process proceeds to step 716 where the second sequence of actions to be controlled by the input device is generated for output, for example, at a computing device. The computing device may generate for output at, for example, a display and/or via a speaker attached to the computing device, the sequence of actions to be controlled via the input device. In another example, the sequence of actions may be generated for output at the input device via, for example, an integral display and/or speaker. The input device may receive the sequence to be generated for output from the computing device. In some examples, the sequence of actions may be received via controlling a character around a pre-determined virtual path. The process then proceeds to step 718.

At step 718, a second plurality of inputs are received at the input device. These inputs correspond to the second sequence of inputs or the second sequence of actions to be controlled as determined in step 712. At step 720, a second plurality of signals associated with the second plurality of inputs are received. This second plurality of signals may be received via, for example, a muscle activity sensor as described herein. At step 722, the first plurality of signals is compared with the second plurality of signals, and at step 724, it is determined that the first plurality of signals is associated with a fastest reaction time. At step 726, a recommendation to use the first plurality of inputs is generated for output. This recommendation may be generated for output via a display attached to the computing device, and/or via a speaker attached to the computing device. This recommendation may be integral to an application running on the computing device. In other examples, the recommendation may be generated for output via the input device, for example, via an integral screen and/or speaker. In some examples, the recommendation may be transmitted from the computing device to the input device. In this manner, a recommendation for controlling an application that has the fastest reaction time can be generated for output, thereby enabling an improved input to the computing device.

In some examples, the process 700 may utilize a muscle activity sensor, such as an EMG sensor, which measures electrical impulses produced during muscle contractions and generates one or more signals indicating the measured electrical impulses, enabling muscle activity that precedes motor actions to be detected. In this example, in addition to receiving first and second pluralities of signals associated with each of the plurality of inputs (steps 710, 720), the muscle activity sensor may generate muscle activity signals, and these signals may be received as well as the input signals associated with the inputs, such as button presses. At step 722, the comparing may also comprise comparing the received muscle activity signals in order to help determine which plurality of inputs to recommend. In some examples, a recommendation may be based on the plurality of inputs associated with the fastest muscle activity response. The fastest muscle activity response may be based on the average (mean median or mode) response associated with the muscle activity sensor. In some examples, a weighted average may be used, for example, a first input, or first group of inputs, may be deemed more important than other inputs and a weighting may be applied in order to favor those inputs.

In some examples, an application running on a computing device, such as a video game or a simulation, may offer a user a play-through scenario where several actions may be requested for the user to perform. The application may display a default control associated with an action, but may let the user decide which input element, such as a key or button, to utilize to activate, or perform, the indicated action. In order to initiate the process, the application may start with basic instructions relating to an avatar such as "move forward," "look up," and/or "fire your weapon." The application may detect more than one activated input element for a particular action. For example, when instructed to move forward, the user may first look around with a mouse, which the application may first interpret as a forward movement and move the avatar forward. Once the application detects that the user has stopped using the mouse and has activated another control such as pressing the "W" key, the application may stop moving the avatar when the mouse is activated and instead move the avatar upon activation of the "W" key.

In some examples, the application may first instruct a user to perform actions that are more likely to be performed on a particular input device such as a mouse or a keyboard. For example, to avoid the need to re-interpret an input as described above, the application may elect to first instruct the user to look around, assuming the mouse will be used. Once the mouse controls have been mapped, for example, any further interaction scenario instructing the player to perform certain tasks may not consider mouse interactions as part of the interaction to be mapped into an action per the scenario.

The application may also detect that the user initial key selection for an action is further changed. For example, the application may instruct the user to move towards an in-game element, and the user may briefly press key "A," which causes an avatar to move in direction X, but then detects that the user then presses key "B" for a longer duration. Instead of moving the player's avatar in direction Y or ignoring that interaction completely because of a key press different than "A," the application may elect to continue moving the avatar in direction X, assuming that the initial movement proposed by the game did not correspond to the original user intent when they pressed key "A."

To help the user understand what input element, such as a key or button, is being programmed through their action, the application may generate a message for output, for example on a screen associated with a computing device running the application, informing the user of the new input element assignment. For example, the application may display "[W] is now the key to move forward" upon the user pressing the "W" key when instructed to move forward in a particular scenario. Such a message may be repeated if the application detects the user's intent to change that original key binding, but the message may not be displayed again upon activation of that key for the same action it was originally programmed for.

Similarly, to a menu-based key binding method, the application may detect duplicate input element, such as key, bindings that may interfere with usage of the application, such as gameplay. For example, the key "W" may be associated with "forward," and when asked to open their map, a player may press that same "W" key. In response, the application may display a message explaining the conflict, and not assign the action of opening the map to that key. Additionally, during a first scenario, the application may detect that a user continues to use a key already bound to a first action for a second action, and may decide to allocate that key to that second action and to de-allocate it from the first action. Upon finalizing the first scenario, the application may then select a second scenario in which the user will be prompted to execute the first action in order to bind it to a new key.

The application may also offer input element-bindings, such as key-bindings, via playable scenarios as a complement to a traditional key-binding menu. For example, the application may include a setting for "select through play" and/or "play my selection." Upon selecting a "select through play" option for a particular action, the application may generate a scenario requiring that action to be performed and instructing the user to do so. When selecting "play my selection," the application may also generate a scenario requiring that action to be performed but instead of binding any key pressed during that scenario execution to the action, generate a first interaction in which only the selected key can be used, then generate for output a confirmation that that key is confirmed. If the user confirms the choice, then the key is kept bound; if not, then the application generates a second interaction in which a new key selected by the user during that second interaction is bound to the action.

FIG. 8 shows an example GUI, in accordance with some embodiments of the disclosure. The GUI 800 comprises an action portion 802, a main key portion 804, a play to set portion 806 and a play to test portion 808. The action portion 802 is a column of actions that can be controlled by input from an input device including, for example, "Forward," "Back" and "Strafe left.". The Main Key portion 804 is a column of inputs (e.g., keyboard keys and/or mouse buttons) that can be used to perform each action in the action column 802, for example, "W," "S" and "D." This may, for example, represent a default key binding for that action. The play to set portion 806 comprises inputs that are set (not shown in this example) by performing a sequence of actions, such as controlling a character to move "Forward," "Back" and "Strafe left." These may be set as described in connection with FIG. 7 above. The play to test portion 808 is a column of inputs that are set via testing, such as the result of testing two different inputs and selecting the input with the fastest reaction time as described in connection with FIG. 7 above.

Row 810 is highlighted, enabling, for example, input to be provided that overwrites an existing key binging in each of the main key, play to set and play to test columns 804, 806, 808. In this example, the main key 812 for the action "Reload/Sheathe Weapon" is "R," and no keys are currently set for play to set 814 or play to test 816. In this example, input may be provided to manually set the keys for each of these columns. Section 818 indicates that some actions may require a binding to be set. In this example, the action "Open data menu" 819 has a star ("*") associated with it, indicating that a binding needs to be set. This may be performed as discussed in connection with highlighted row 810. Section 820 indicates whether there are any binding conflicts (none shown in this example). A binding conflict may arise, for example, if the same input is set for two different directions, such as the key "A." This conflict may appear in section 820, and at least one of the actions may be selectable, enabling a different input to be selected for the binding. On the input of a designated button, or key, 822, all of the key bindings may be reset to a default key binding. In this example, the bindings menu may be exited by pressing the "tab" key, as indicated at 824.

In some examples, an application, such as a game, may infer a set of key bindings based on a set of key activation a user used to perform a complex action. For example, the application may instruct a user to move toward an in-game element and pick it up. Upon detecting that the user interacted with an input element, such as pressing key A, for x amount of time and then key B for y amount of time, and knowing that distance from initial location to the element was z, the application may infer that key A is for "forward" and key B is for "left."

Figure 9:
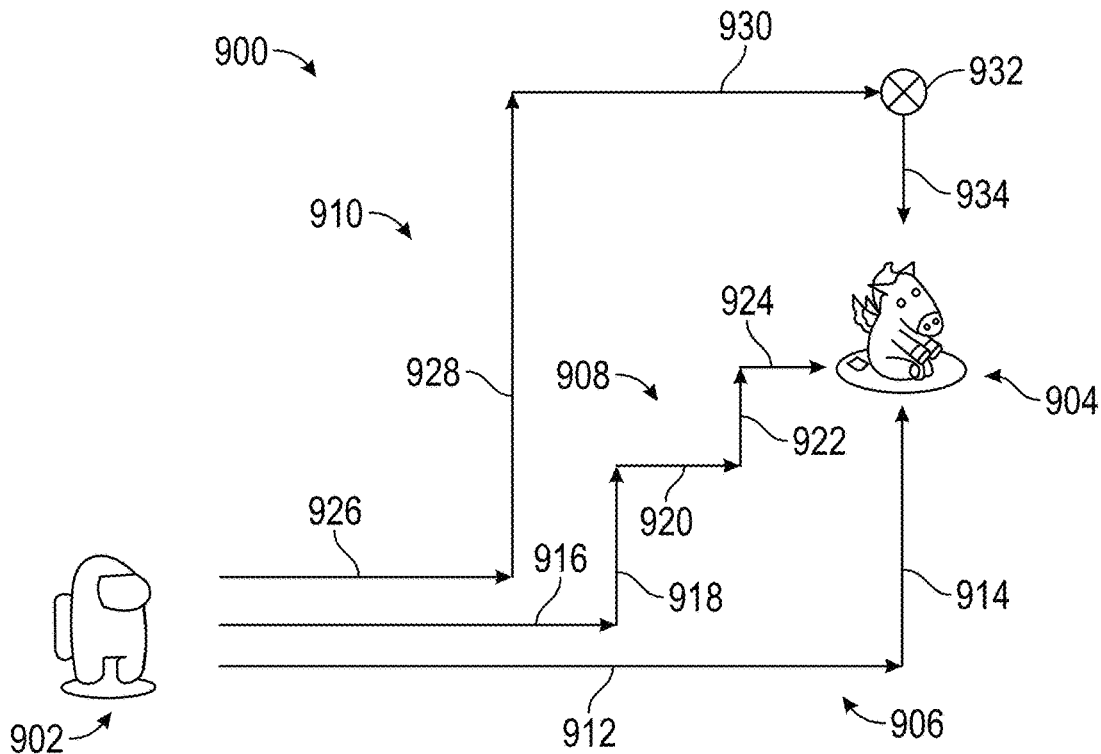
FIG. 9 shows an example input activation path, in accordance with some embodiments of the disclosure.

FIG. 9 shows an example input activation path, in accordance with some embodiments of the disclosure. The environment 900 comprises an avatar 902 that is moved towards an in-application element 904 at a constant speed via one of a plurality of paths 906, 908, 910. In a first example, path 906, comprises moving the avatar 902 in a first direction 912 for a first distance and a second direction 914 for a second distance. In this example, the first distance is approximately three times as long as the second distance. On receiving a first input for a time period that is approximately three times as long as a received second input, it can be inferred that the first input is associated with the first direction 912, and the second input is associated with the second direction 914, and hence the inputs can be mapped to performing an action, such as moving "left" or moving "up."

The key mappings determined from the first path 906 may be confirmed via the second path 908. The second path comprises moving the avatar 902 in the first direction 916, 920, 924 and the second direction 918, 922. By measuring the time an input is received for and comparing it to a relative distance of each movement element, the input mappings may be confirmed, for example, if the relative time an input is selected for corresponds to the relative distance of each movement element of the second path 908.

A third path 910 may be used to receive a mapping for a third direction. The third path comprises moving the avatar 902 in the first direction 926, 930, the second direction 928 and a third direction 934. On reaching location 932, if a third input is received, then this input may be mapped to the third direction 934.

In order to program all in-application actions interactively, the application may create interactive scenarios for each action in an ordered fashion. For example, a scenario that involves a combination of multiple actions may be preceded by a series of scenarios that already included part of the actions of the combination (as illustrated in path 910 of FIG. 9).

The application may create interactive scenarios by placing virtual elements in a virtual world and prompting the user to interact with these elements. It may also prompt the user to do so repeatedly by including previous fulfilled interaction requests into new scenarios, the objective being to confirm that the user selections are correctly taken into account. For example, a first scenario may comprise generating for output a request for the user to move to a certain virtual location, and a second scenario may comprise generating for output a request to interact with a certain virtual element located at a specific location. While playing the second scenario, the user may confirm the choices they made for movement bindings while interacting with the first scenario.

The application may also generate a first scenario that prompts the user to perform in-game actions that have no impact on any virtual elements or the avatar. Such actions may include, for example, opening an inventory and/or a map, executing a quick save or a quick load, and/or opening a chat window. The application may include other interaction scenarios once the first scenario has been executed. For example, upon completion of opening an inventory, the application may generate a prompt to prompt the user to navigate into certain subcategories of their inventory, or upon opening the map, the application may generate a prompt to prompt the player to zoom in and zoom out.

The application may also generate scenarios that combine previously bound actions in a manner that is representative of what the actual application interactions are going to be in order to help ensure that the user input element choices such as key and button choices, are adequately positioned for a relatively good user experience. For example, after having programmed movements such as jump, crouch, sprint, draw, and actions such as fire, the application may generate a scenario in which a user is instructed to eliminate enemies while jumping over obstacles, running to avoid automated fire, and crouching to avoid detection. By generating such a scenario and forcing a user to use the input elements that they have selected, the application helps that user to detect inconsistent choices of input elements, or impossible combinations of input elements. For example, in the previous scenario, the user may have selected keyboard cursor keys for movement, the left mouse button for fire, the "A" button for crouch and the space bar for jump. During scenario execution, it may become clear to the user that they are not able to move, fire, crouch and jump quickly enough to reach the scenario target, as their left hand may have to consistently move to alternatively reach the keyboard cursor keys, the "A" key and the space bar. In some examples, a muscle activity sensor, such as an EMG sensor, may be utilized, enabling muscle activity that precedes motor actions to be detected. In this example, the output of a muscle activity sensor may be used to help determine that a user may be relatively slow to react to one or more required actions. The muscle activity sensor data may be compared to received input element interaction data, such as button press input data, in order to determine whether any delay is due to a user being slow to react (indicated by the muscle activity sensor data) or whether the user is not able to reach an input, such as a button, in time (i.e., the difference between the muscle activity sensor indicating the beginning of a muscle movement and the actual button press to relatively long). In further examples, one or more of the aforementioned examples associated with FIGS. 1-6 may be utilized in order to improve a reaction time. For example, the muscle activity sensor data may be utilized in order to predict an interaction with an input element, such as a button press, and any proximity sensors may also be utilized.

Figure 10:
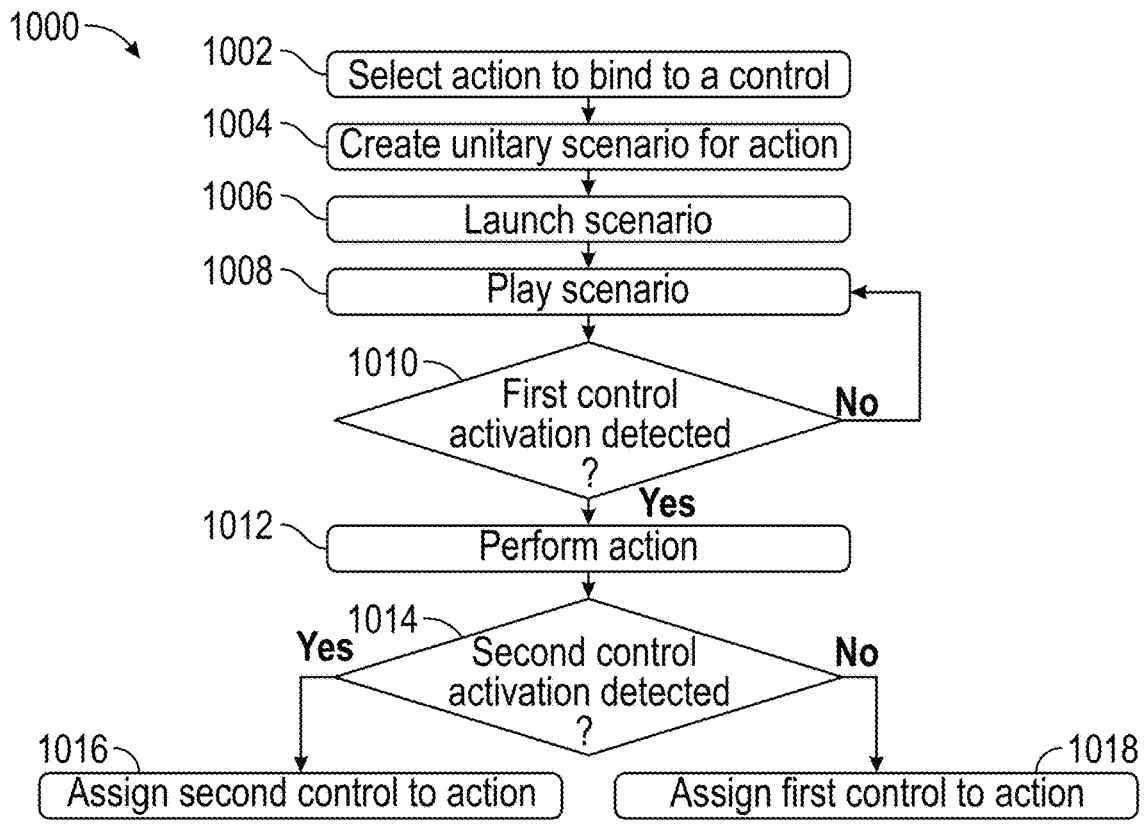
FIG. 10 shows another flowchart of illustrative steps for enabling improved input at an input device, in accordance with some embodiments of the disclosure.

FIG. 10 shows another flowchart of illustrative steps for enabling improved input at an input device, in accordance with some embodiments of the disclosure. Process 1000 may be implemented, in whole or in part, on any of the computing devices mentioned herein. In addition, one or more actions of the process 1000 may be incorporated into or combined with one or more actions of any other processes or embodiments described herein.

At step 1002, an action to bind to a control is selected, and at step 1004, a unitary scenario for the action is created. At step 1006, the scenario is launched, and at step 1008, the scenario is played. At step 1010, it is determined whether a first control activation is detected. If, at step 1010, it is determined that the first control action is not detected, then the process loops back to step 1008. If, at step 1010, it is determined that the first control action is detected, then the process proceeds to step 1012, where the action is performed. At step 1014, it is determined whether a second control activation is detected. If, at step 1014, the second control action is detected, then the process assigns the second control to the action at step 1016. If, at step 1014, the second control action is not detected, then the process assigns the first control to the action at step 1018.

In some examples, to generate scenarios, an application, such as a game, may use procedural level generation and/or a collection of pre-established levels. When instructing a procedural engine to generate a virtual world, the application may include guidance such as "Generate a cave environment of size X,Y,Z with a hole, an obstacle and an interactable chest; user starting point is xp,yp,zp; chest starting point is xc,yc,zc" that would generate a scenario requiring the combination of various actions such as "movement," "jump" and "interact" to be programmed.

The application may include input element binding, such as key binding, scenarios as part of an introduction overall training scenario in which users are not only introduced to the mechanics of the application (e.g., in-game permitted actions) but also given the opportunity to customize their application usage to their needs. The scenario may be built using in-application textual pop-up messages, or may be voiced by an in-application element such as a companion, a non-playable character (NPC), or a remote virtual assistant.

The examples discussed herein here may be extended to extended reality (XR), including virtual reality environments, where user gestures may be assigned to certain actions. For example, an XR application may generate an indication requesting that a user select a gesture to interact with an NPC, instead of imposing a wave or a pointing finger.

FIG. 11 shows a block diagram representing components of an input device and dataflow therebetween for enabling an improved input device, in accordance with some embodiments of the disclosure. Input device 1100 comprises input circuitry 1104, control circuitry 1108 and output circuitry 1154. The input device 1100 may be, for example, a gamepad. Control circuitry 1108 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input and second input 1102, 1137 are received by the input circuitry 1104. The input circuitry 1104 is configured to receive inputs related to muscle activity and proximity to an input element. In the case of the first signal, the input circuitry 1104 may receive an input from a muscle activity sensor, such as an electromyography sensor. In the case of the second signal, the input circuitry 1104 may receive an input from a proximity sensor. The input circuitry 1104 transmits 1106 the user input to the control circuitry 1108.

The control circuitry 1108 comprises a first signal receiving module 1110, a first signal comparing module 1114, a first signal digit movement determining module 1118, a first signal not corresponding to input element identifying module 1122, a movement direction identifying module 1126, a first prediction generating module 1130, a first confidence level identifying module 1134, a second signal receiving module 1139, a digit velocity determining module 1142, a second prediction generating module 1146, a second confidence level identifying module 1150, and output circuitry 1154 comprising a third signal output module 1156.

A first input, represented by the first signal, is transmitted 1106 from the input circuitry 1104 to the first signal receiving module 1110, where the first signal is received. An indication of the received first signal is transmitted 1112 to the first signal comparing module 1114, where the first signal is compared to one or more stored signals. The result of the comparing is transmitted 1116 to the first signal digit movement determining module 1118, where it is determined that the first signal corresponds to a movement of a user digit. The result of the determination is transmitted 1120 to the first signal not corresponding to input element identifying module 1122, where it is identified that the first signal does not correspond to a first interaction with one or more input elements of an input device. An indication that the first signal does not correspond to an interaction with an input element is transmitted 1124 to a movement direction identifying module 1126, where a movement direction of the user digit is identified based on the received first signal. An indication of the movement direction of the user digit is transmitted 1128 to the first prediction generating module 1130, where a first prediction of a second interaction with one or more input elements of the input device is generated. This first prediction is transmitted 1132 to the first confidence level identifying module 1134, where a first confidence level associated with the prediction is identified to be below a threshold. An indication that the first confidence level is below the threshold is transmitted 1136 to the second signal receiving module 1139, where a second signal from a proximity sensor is transmitted 1138 via the input circuitry 1104. The second signal receiving module 1139 transmits 1140 the second signal to the digit velocity determining module 1142, where a velocity of the user digit is determined. The determined velocity is transmitted 1144 to the second prediction generating module 1146, where a second prediction of the second interaction is generated based on the first signal and the determined velocity of the user digit. The second prediction is transmitted 1148 to the second confidence level identifying module 1150, where it is determined that the second confidence level is above the threshold confidence level. The second prediction of an interaction with a first user input element is transmitted 1152 to the output circuitry 1154, where the third signal output module 1156 generates a signal associated with the first user input element for output.

FIG. 12 shows a block diagram representing components of a computing device and dataflow therebetween for enabling improved input at an input device, in accordance with some embodiments of the disclosure. Computing device 1200 comprises input circuitry 1204, control circuitry 1208 and output circuitry 1258. The computing device 1200 may be, for example, an Xbox Series S. Control circuitry 1208 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First, second, third, fourth and fifth inputs are received 1202, 1216, 1224, 1236, 1244 by the input circuitry 1204. The input circuitry 1204 is configured to receive inputs related to a computing device, for example, via a gamepad, and to receive inputs related to muscle activity, for example, via an electromyography sensor. In other examples, the input related to a computing device may be received via a touchscreen of a smartphone, an infrared controller, a Bluetooth and/or Wi-Fi controller of the computing device 1200, a keyboard, a mouse and/or a microphone. In another example, the input may be received via a gesture detected via an extended reality device. In a further example, the input related to a computing device may comprise instructions received via another computing device. The input circuitry 1204 transmits 1206, 1218, 1226, 1238, 1246 the user input to the control circuitry 1208.

The control circuitry 1208 comprises a first sequence generation module 1210, a first input receiving module 1214, a first signal receiving module 1222, a second sequence generation module 1230, a second input receiving module 1234, a second signal receiving module 1242, a signal comparing module 1250, a fastest reaction time determination module 1254 and output circuitry 1258 comprising a sequence recommendation output module 1260.

A first input 1202 is transmitted 1206 from the input circuitry 1204 to the first sequence generation module 1210, where a first input sequence is generated for output. An indication that the first sequence has been generated for output is transmitted 1212 to the first input receiving module 1214, where a first sequence of inputs 1216 is received at the input circuitry 1204 and is transmitted 1218 to the first input receiving module 1214. An indication of the received first sequence of inputs is transmitted 1220 to the first signal receiving module 1222, where a first signal 1224, such as a signal from a muscle activity sensor, is transmitted 1226 from the input circuitry 1204 to the first signal receiving module 1222. The received first signal is transmitted 1228 to the signal comparing module 1250 via the second sequence generation module 1230, the second input receiving module 1234 and the second signal receiving module 1242.

At the second sequence generation module 1230, a second input sequence is generated for output. An indication that the second sequence has been generated for output is transmitted 1232 to the second input receiving module 1234, where a second sequence of inputs 1236 is received at the input circuitry 1204 and is transmitted 1238 to the second input receiving module 1234. An indication of the received first sequence of inputs is transmitted 1240 to the second signal receiving module 1242, where a second signal 1244, such as a signal from a muscle activity sensor, is transmitted 1246 from the input circuitry 1204 to the second signal receiving module 1242. The received second signal is transmitted 1248 to the signal comparing module 1250, where the received first signal and the received second signal are compared. The result of the comparison is transmitted 1252 to the fastest reaction time determination module 1254, where a fastest reaction time associated with a received input at the input device is determined. An indication of the received input with the fastest reaction time is transmitted 1256 to the output circuitry 1258, where the sequence recommendation output module 1260 generates a recommendation for output based on the fastest reaction time.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, via a muscle activity sensor associated with an input device comprising one or more input elements, a first signal;
comparing the first signal to one or more stored signals;
determining, based on the comparing, that the first signal corresponds to a movement of a user digit;
identifying, based on the comparing, that the first signal does not correspond to a first interaction with one of the one or more input elements of the input device;
identifying, based on the first signal, a movement direction of the user digit;
generating, based on the identified movement direction of the user digit, a first prediction of a second anticipated interaction with one of the one or more input elements of the input device;
identifying that a first confidence level associated with the first prediction is below a threshold confidence level;
receiving, via a proximity sensor associated with the input device, a second signal;
determining, based on the second signal, a velocity of the user digit;
making a second prediction, based on the first signal and the determined velocity of the user digit, of the second anticipated interaction;
identifying that a second confidence level associated with the second prediction is above the threshold confidence level; and
generating, for output and based on the second prediction, a third signal indicative of the second anticipated interaction with a first input element of the input device.

2. The method of claim 1, wherein the muscle activity sensor is an electromyography sensor.

3. The method of claim 1, wherein the muscle activity sensor and the proximity sensor are integral to the input device.

4. The method of claim 1, wherein the muscle activity sensor and the proximity sensor are remote from the input device.

5. The method of claim 1, wherein making the second prediction further comprises:
receiving a fourth signal associated with a grip sensor;
determining, based on the fourth signal, a grip of the input device;
receiving a fifth signal associated with an orientation of the input device;
determining, based on the fifth signal, an orientation of the input device; and wherein:
making the second prediction is further based on the determined grip of the input device and the determined orientation of the input device.

6. The method of claim 1, further comprising identifying, based on the first signal, a grip style of the input device, and wherein determining that the first signal corresponds to the movement of the user digit is further based on the identified grip style.

7. The method of claim 1, further comprising:
generating, for output, an instruction to hold the input device in an indicated manner;
receiving, via the muscle activity sensor, a fourth signal;
generating, via a calibration of the input device and based on the fourth signal, calibration data; and
wherein determining that the first signal corresponds to the movement of the user digit is further based on the calibration data.

8. The method of claim 7, wherein the threshold confidence level is a first threshold confidence level, and wherein the method further comprises:
filtering, based on the calibration data, the first signal to generate a filtered first signal
identifying, via the filtered first signal, a start signal associated with pre-movement muscle signals;
identifying an associated confidence level of the start signal;

determining that the confidence level of the start signal is above a second threshold confidence level; and wherein:
    determining that the first signal corresponds to the movement of the user digit is further based on the start signal.

9. A method comprising:
generating, for output, a first sequence of inputs to be received at an input device;
receiving, at the input device, the first sequence of inputs;
receiving, via a muscle activity sensor associated with the input device, a first plurality of signals associated with the first sequence of inputs;
generating, for output, a second sequence of inputs to be received at the input device;
receiving, at the input device, the second sequence of inputs;
receiving, via the muscle activity sensor, a second plurality of signals associated with the second sequence of inputs;
comparing the first plurality of signals with the second plurality of signals;
determining, based on the comparing, that the first plurality of signals is associated with a fastest reaction time; and
generating, for output, a recommendation to use the first sequence of inputs that is associated with the fastest reaction time.

10. The method of claim 9, wherein:
the generating the first sequence of inputs further comprises generating a first sequence of actions to be controlled by the input device; and
the generating the second sequence of inputs further comprises generating a second sequence of actions to be controlled by the input device.

11. A system comprising:
input/output circuitry configured to:
    receive, via a muscle activity sensor associated with an input device comprising one or more input elements, a first signal; and
processing circuitry configured to:
    compare the first signal to one or more stored signals;
    determine, based on the comparing, that the first signal corresponds to a movement of a user digit;
    identify, based on the comparing, that the first signal does not correspond to a first interaction with one of the one or more input elements of the input device;
    identify, based on the first signal, a movement direction of the user digit;
    generate, based on the identified movement direction of the user digit, a first prediction of a second anticipated interaction with one of the one or more input elements of the input device;
    identify that a first confidence level associated with the first prediction is below a threshold confidence level;
    receive, via a proximity sensor associated with the input device, a second signal;
    determine, based on the second signal, a velocity of the user digit;
    make a second prediction, based on the first signal and determined velocity of the user digit, of the second anticipated interaction;
    identify that a second confidence level associated with the second prediction is above the threshold confidence level; and
    generate, for output and based on the second prediction, a third signal indicative of the second anticipated interaction with a first input element of the input device.

12. The system of claim 11, wherein the muscle activity sensor is an electromyography sensor.

13. The system of claim 11, wherein the muscle activity sensor and the proximity sensor are integral to the input device.

14. The system of claim 11, wherein the muscle activity sensor and the proximity sensor are remote from the input device.

15. The system of claim 11, wherein the processing circuitry configured to make the second prediction is further configured to:
    receive a fourth signal associated with a grip sensor;
    determine, based on the fourth signal, a grip of the input device;
    receive a fifth signal associated with an orientation of the input device;
    determine, based on the fifth signal, an orientation of the input device; and wherein:
        the processing circuitry configured to make the second prediction is further configured make the second prediction based on the determined grip of the input device and the determined orientation of the input device.

16. The system of claim 11, wherein the processing circuitry is further configured to identify, based on the first signal, a grip style of the input device, and wherein the processing circuitry configured to determine that the first signal corresponds to the movement of the user digit is further configured to base the determination on the identified grip style.

17. The system of claim 11, wherein the processing circuitry is further configured to:
    generate, for output, an instruction to hold the input device in an indicated manner;
    receive, via the muscle activity sensor, a fourth signal;
    generate, via a calibration of the input device and based on the fourth signal, calibration data; and
    wherein the processing circuitry configured to determine that the first signal corresponds to the movement of the user digit is further configured to make the determination based on the calibration data.

18. The system of claim 17, wherein the threshold confidence level is a first threshold confidence level, and the processing circuitry is further configured to:
    filter, based on the calibration data, the first signal to generate a filtered first signal;
    identify, via the filtered first signal, a start signal associated with pre-movement muscle signals;
    identify an associated confidence level of the start signal;
    determine that the confidence level of the start signal is above a second threshold confidence level; and wherein:
        the processing circuitry configured to determine that the first signal corresponds to the movement of the user digit is further configured to determine that the first signal corresponds to the movement of the user digit based on the start signal.

* * * * *